Nov. 17, 1970  R. B. LAUCK  3,540,220
HYDROSTATIC TRANSMISSON CONTROL SYSTEM
Filed March 26, 1968  7 Sheets-Sheet 1

INVENTOR.
ROBERT B. LAUCK
BY
Yount, Flynn & Tarolli
ATTORNEYS

INVENTOR.
ROBERT B. LAUCK

Nov. 17, 1970     R. B. LAUCK     3,540,220
HYDROSTATIC TRANSMISSON CONTROL SYSTEM
Filed March 26, 1968                7 Sheets-Sheet 3
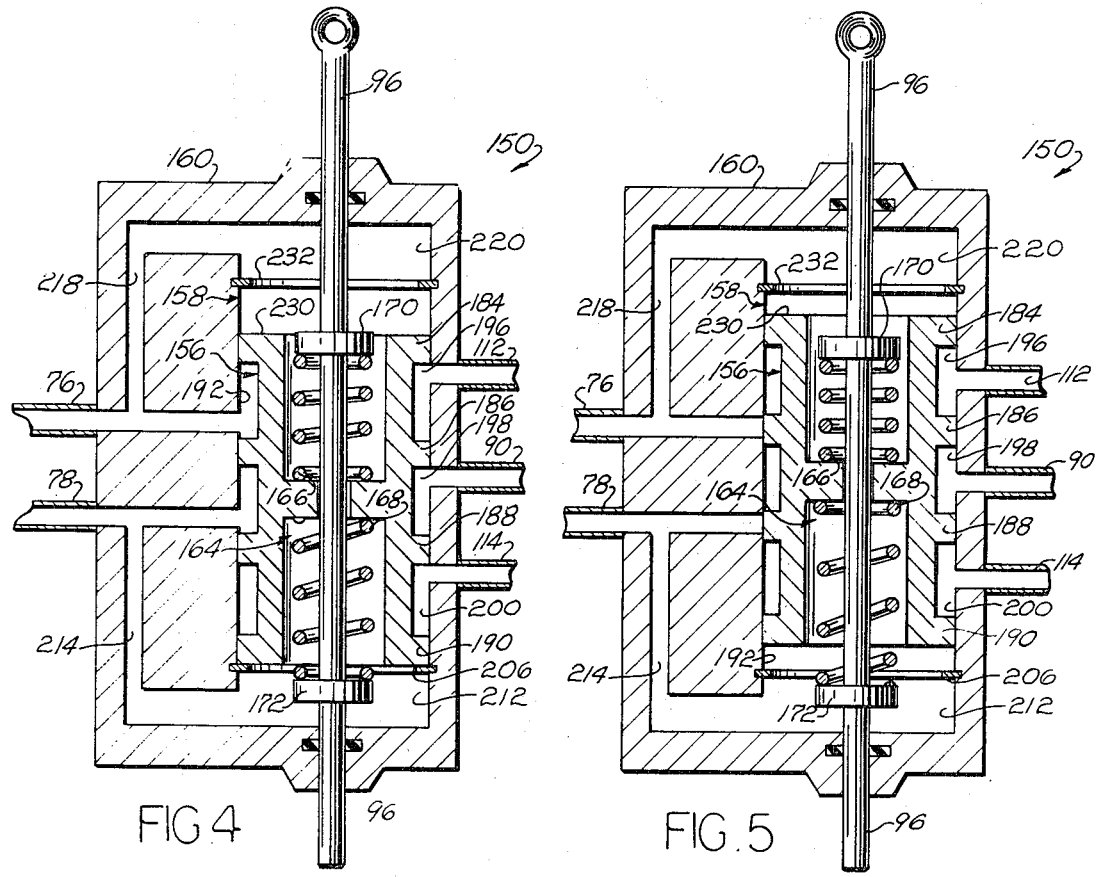
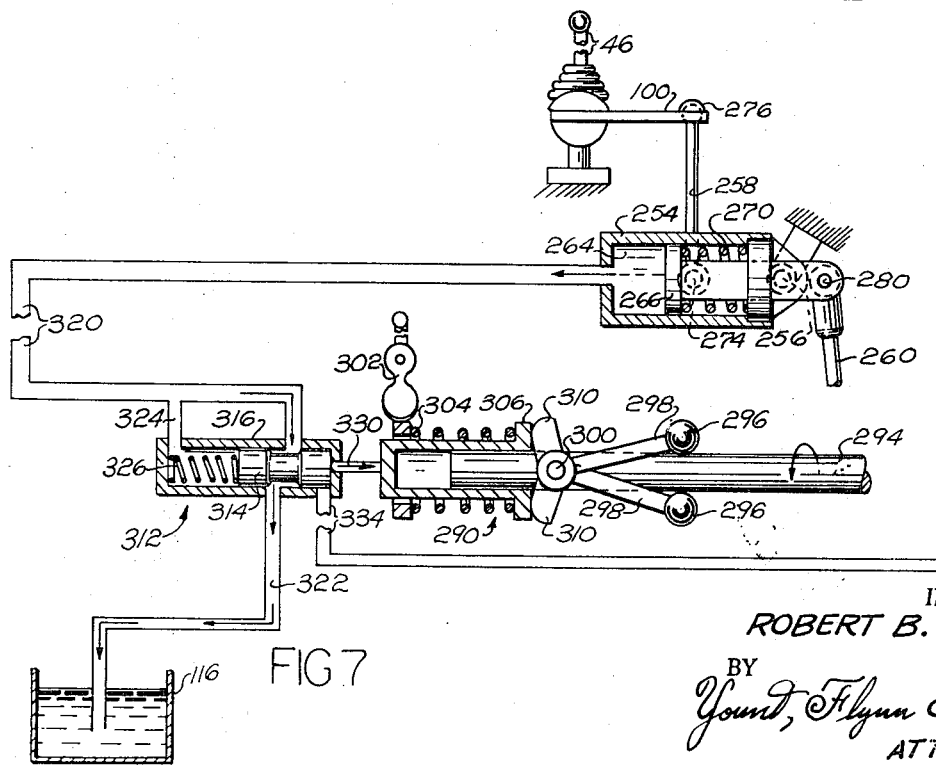
INVENTOR.
ROBERT B. LAUCK
BY
Young, Flynn & Tarolli
ATTORNEYS

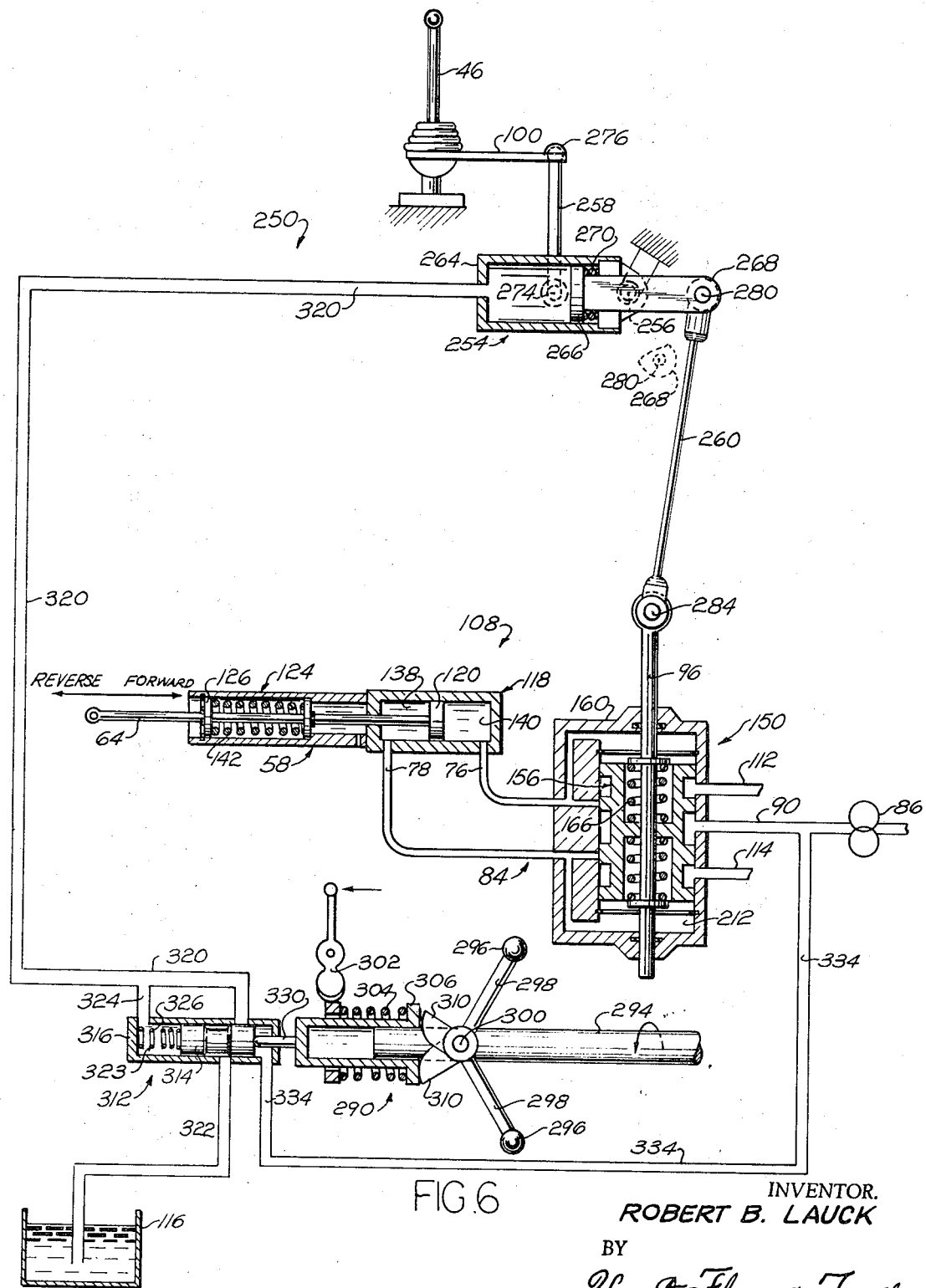

INVENTOR.
ROBERT B. LAUCK
BY
Yount, Flynn & Tarolli
ATTORNEYS

INVENTOR.
ROBERT B. LAUCK

United States Patent Office  3,540,220
Patented Nov. 17, 1970

1

3,540,220
HYDROSTATIC TRANSMISSION CONTROL
SYSTEM
Robert B. Lauck, Southfield, Mich., assignor to Eaton
Yale & Towne Inc., Cleveland, Ohio, a corporation
of Ohio
Filed Mar. 26, 1968, Ser. No. 716,204
Int. Cl. F02b 41/00; F15b 11/16; B62d 11/00
U.S. Cl. 60—19                                39 Claims

ABSTRACT OF THE DISCLOSURE

Disclosed herein is a hydraulic control system for controlling the operation of a pair of hydrostatic transmissions. The hydraulic control system includes two control cylinder assemblies and two valve assemblies, one of each being associated with one of the hydrostatic transmissions. In one embodiment, a single manually operable actuator member is provided for operating the valve assemblies which in turn control the cylinder assemblies to regulate the direction of operation and the input to output speed ratio or drive ratio of the hydrostatic transmissions. An antistall means is associated with each of the hydrostatic transmissions for reducing the output speed of the associated hydrostatic transmission when a sensor assembly detects an impending stalling of an engine or source of power connected to the hydrostatic transmission.

---

This invention relates generally to a control system and more particularly to a hydraulic control system for regulating the operation of a plurality of hydrostatic transmissions.

It is an object of this invention to provide a new and improved hydraulic control system for regulating the operation of each of a plurality of hydrostatic transmissions.

It is another object of this invention to provide a new and improved control system, as set forth in the preceding paragraph, wherein the hydraulic control system is associated with a single actuator lever which is selectively moved to control the speed ratio and direction of operation of the hydrostatic transmissions independently of each other.

It is another object of this invention to provide a new and improved antistall system for reducing the output speed of each of a plurality of hydrostatic transmissions by substantially equal percentages to maintain a predetermined output speed relationship between the hydrostatic transmissions while reducing the output speeds to prevent a stalling of a source of power associated with the hydrostatic transmissions.

Another object of this invention is to provide a new and improved hydraulic control system including a first hydraulic control means operatively associated with a first hydrostatic transmission for controlling the operation of the first hydrostatic transmission independently of the operation of a second hydrostatic transmission, a second hydraulic control means operatively associated with the second hydrostatic transmission for controlling the operaton of the second hydrostatic transmission independently of the operation of the first hydrostatic transmission, and an actuator member operatively connected to the first and second hydraulic control means for selectively operating the first and second hydraulic control means to regulate the operation of the first and second hydrostatic transmissions.

It is another object of this invention to provide a new and improved control system as set forth in the preceding paragraph which further includes first and second antistall means operatively associated with the first and second control means respectively for at least partially re-

2 versing the operation of the first and second hydraulic control means by substantially proportional amounts when a source of power associated with the hydrostatic transmissions is tending to stall to thereby reduce the stalling tendency of the source of power while maintaining substantially constant the input to output speed ratio between the hydrostatic transmissions.

It is another object of this invention to provide a new and improved apparatus for controlling the transmission of power from a source of power to separate drive tracks of a vehicle by a plurality of hydrostatic transmissions each of which is operatively connected to one of the drive tracks, wherein the apparatus includes separate hydraulic power means each of which is associated with one of the hydrostatic transmissions to effect operation thereof, a hydraulic control means for controlling the actuation of the hydraulic power means, and a manually operable control means operatively associated with the hydraulic control means and operable to effect simultaneous control of the hydraulic power means.

It is another object of this invention to provide a new and improved apparatus as set forth in the preceding paragraph wherein the control means includes first and second valve assemblies which are operatively connected to the manual control means for operation to varying extents, the first valve assembly being operatively connected to one of the hydraulic power means for varying the input to output speed ratio of one of the hydrostatic transmissions independently of the other hydrostatic transmission upon operation of the control means, the second valve assembly being operatively connected to the other hydraulic power means for varying the input to output speed ratio of the other hydrostatic transmission independently of the one hydrostatic transmission upon operation of the manual control means.

Another object of this invention is to provide a new and improved apparatus in accordance to the preceding paragraph, said apparatus further including antistall means operatively connected to the first and second valve assemblies for contemporaneously decreasing by substantially proportional amounts the extent of operation of the first and second valve assemblies to thereby effect a decrease in the output speed of each of the hydrostatic transmissions while maintaining a substantially constant relationship between the input to output speed ratios of each of the hydrostatic transmissions.

It is another object of this invention to provide a new and improved apparatus for controlling the operation of first and second hydrostatic transmissions for transmitting power in forward and reverse directions independently of each other, said apparatus including first and second hydraulic control means operatively associated with the first and second hydrostatic transmissions respectively for actuating the associated hydrostatic transmission to thereby adjust the ratio of input speed to output speed of the hydrostatic transmissions, and actuator means connected to the first and second hydraulic control means and operable between an initial position and a plurality of operated positions, the first and second hydraulic control means being responsive to the position of the actuator means to actuate the associated regulator means to thereby adjust the speed or drive ratio of the first and second hydrostatic transmissions and the direction of operation of the first and second hydrostatic transmissions as a function of the position of the actuator means.

It is another object of the invention to provide a new and improved apparatus as set forth in the preceding paragraph wherein the first and second hydraulic control means includes first and second antistall means respectively, the first and second antistall means being responsive to an indication of an impending stall condition of a source of power connected to the first and second hydrostatic transmissions to independently reduce the output speed of the first and second hydrostatic transmissions by amounts which are proportional to the position of the actuator means to thereby prevent stalling of the source of power.

It is another object of this invention to provide a new and improved control assembly for a plurality of hydrostatic transmissions which are operable independently of each other to transmit power from a source of power, the control assembly including control means operatively associated with first and second hydrostatic transmissions respectively for independently adjusting the hydrostatic transmissions to vary their speed ratios, sensor means for detecting at least one condition indicative of a possible impending stalling of the source of power, antistall means operatively associated with the sensor means and the control means for operating the control means to effect substantially proportional reductions in the output speeds of the first and second hydrostatic transmissions to thereby prevent stalling of the source of power by decreasing the speed ratios of the first and second hydrostatic transmissions while maintaining substantially constant the relationship between the speed ratios of the first and second hydrostatic transmissions.

These and other objects and features of the invention will become more apparent upon a consideration of the following detailed description taken in connection with the accompanying drawings wherein:

FIG. 4 is a schematic sectional view of the valve assembly of FIG. 3 in a forward operated position;

FIG. 5 is a schematic illustrational view of the valve assembly of FIG. 4 in the initial position when power is being transmitted by the associated hydrostatic transmission;

FIG. 6 is a schematic illustration of the hydraulic control system of FIG. 3 in association with an antistall system;

FIG. 7 is a schematic illustration of the antistall system of FIG. 6 in a condition corresponding to impending stalling of an engine or source of power associated with the hydrostatic transmission;

Figure 1:
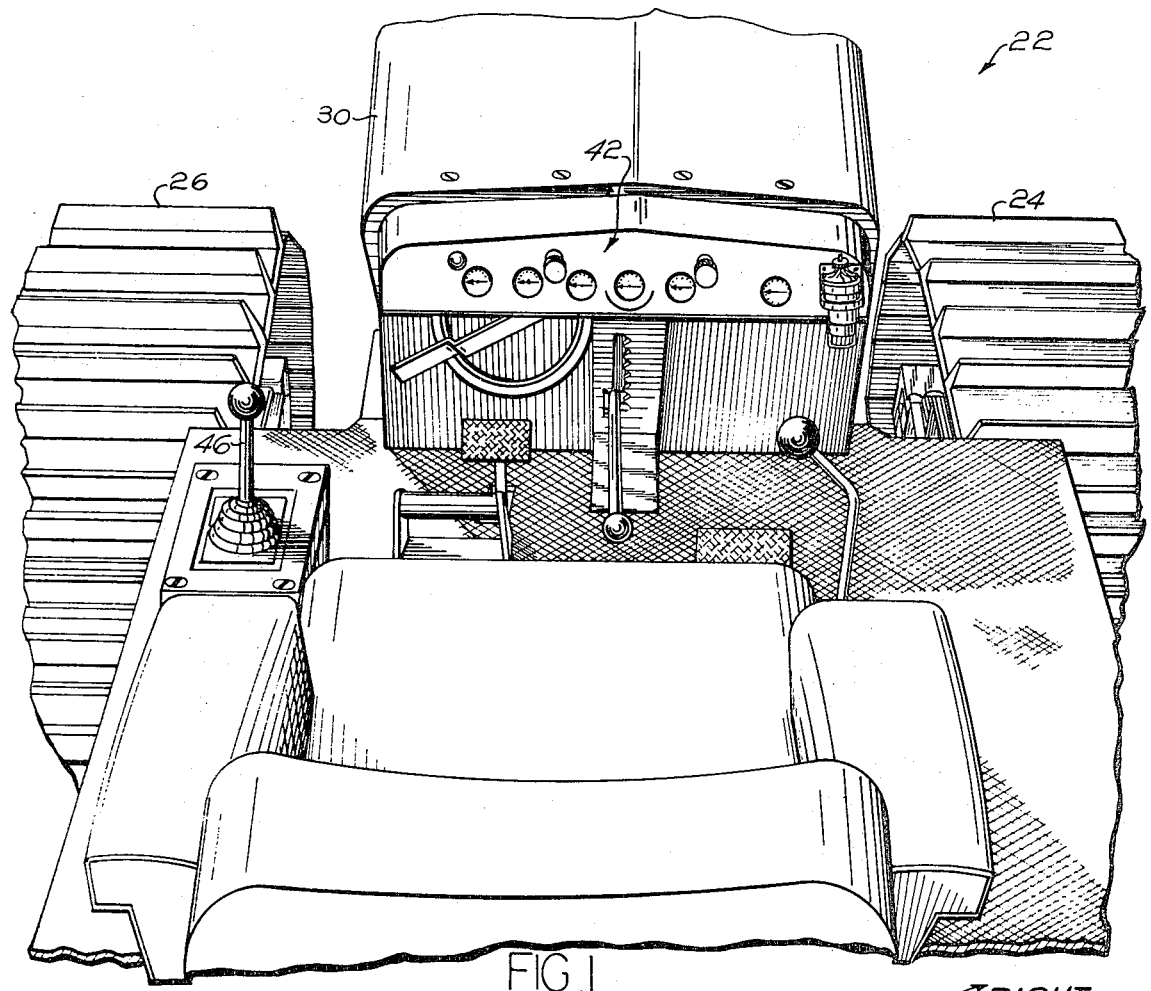
FIG. 1 is a perspective view of a tractor or vehicle having a hydraulic control system constructed in accordance with the present invention.

In accordance with the present invention, a control system is provided for regulating the input to output speed ratio or drive ratio and direction of operation of each hydrostatic transmission of a plurality of hydrostatic transmissions. The control system is responsive to the operation of a single manually operable actuator lever to vary the transmission ratio by and direction of operation of the hydrostatic transmissions in accordance with variations in the position of the actuator lever. An antistall system is advantageously associated with the control system for contemporaneously reducing the output speed of each of the hydrostatic transmissions to prevent a stalling of a source of power associated with the hydrostatic transmissions. Although the hydraulic control system may be used in many different types of environments, it is particularly well adapted for use in vehicles.

As representative of the present invention, a hydraulic control system 20 (FIG. 2) forming a preferred embodiment of the invention is illustrated in the drawings. The hydraulic control system is associated with a tractor or vehicle 22 (FIG. 1) having right and left tracks or treads 24 and 26 which move the tractor 22 relative to the ground or other support surface. The tracks 24 and 26 are driven by power transmitted from an internal combustion engine, or other source of power, located within a housing or compartment 30. The engine is drivingly connected to right and left hydrostatic transmissions 32 and 34 which are operable to transmit power through drive shafts or axles 36 and 38 to the tracks 24 and 26. The operation of the tractor 22 is controlled by pedals and levers, indicated at 42 in FIG. 1, and by a manually operable actuator lever or member 46 (see FIGS. 1 and 2) which controls the ratio of input speed to output speed of the hydrostatic transmissions 32 and 34 and the direction of operation of the hydrostatic transmissions.

Movement of the actuator lever 46 forwardly (as indicated by the arrow in FIG. 2) adjusts the hydrostatic transmissions 32 and 34 to transmit power at substantially equal input to output speed ratios to each of the tracks 24 and 26 to move the tractor in a forward direction. Similarly, when the lever 46 is moved rearwardly, that is the reverse direction as indicated by the arrow in FIG. 2, the hydrostatic transmissions 32 and 34 transmit power at substantially equal rates to the tracks 24 and 26 to move the tractor 22 rearwardly. The further the lever 46 is moved forwardly or rearwardly, the greater is the output speed at which power is transmitted to the tracks.

Figure 2:
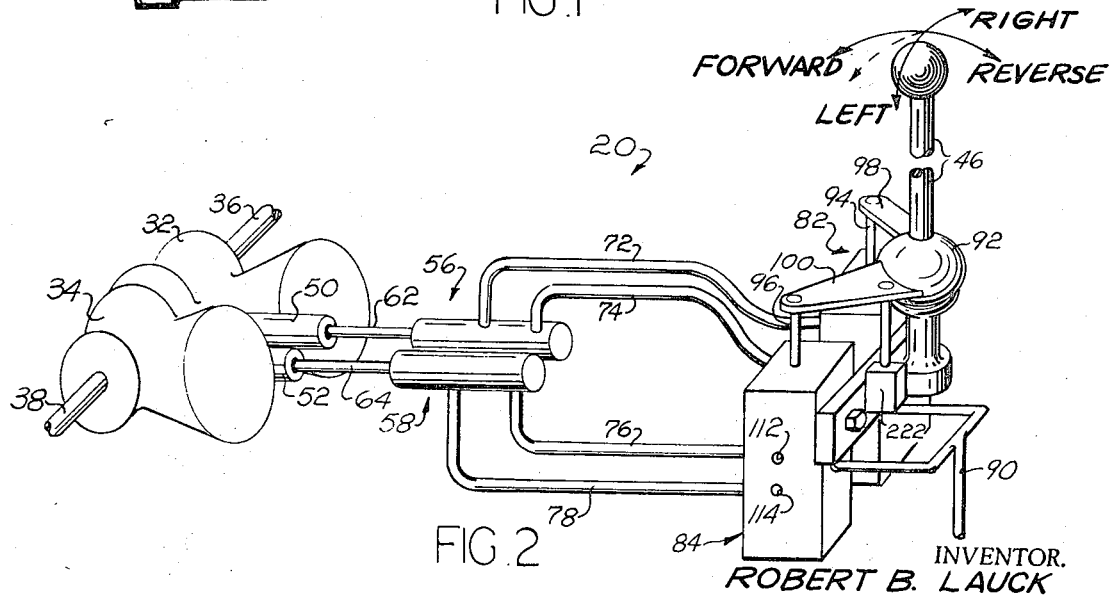
FIG. 2 is a schematic illustrational view of a pair of hydrostatic transmissions which are used to drive tracks of the tractor of FIG. 1, the operation of the hydrostatic transmissions being controlled by the hydraulic control assembly.

The tractor 22 is turned sharply to the right or to the left by moving the actuator 46 to the right or left as indicated by the arrows in FIG. 2. Movement of the actuator lever to the left from the neutral position results in the left hydrostatic transmission 34 being operated in the reverse direction while the right hydrostatic transmission 32 is operated in the forward direction to thereby effect a sharp turning of the tractor. Of course, when the actuator lever 46 is moved to the right, the hydrostatic transmission 32 is operated in the reverse direction while the hydrostatic transmission 34 is operated in the forward direction to effect a sharp turning of the tractor 22 to the right. The tractor can be turned through relatively wide or gradual turns toward the left by moving the actuator lever 46 forwardly and toward the left, as indicated in dashed lines in FIG. 2. It will be understood that the tractor can be turned gradually toward either the left or right and while moving in either forward or reverse direction by suitable positioning of the universally movable actuator lever 46 between the forward, reverse, left, and right positions.

Operation of the manual actuator lever 46 independently varies the drive or speed ratio of each of the hydrostatic transmissions 32 and 34 and the direction of operation of the hydrostatic transmissions through control valve and servomotor assemblies 50 and 52 which vary the drive or speed ratios of the hydrostatic transmissions 32 and 34 by adjusting the "swash" or relative angular position of pump and motor assemblies of the hydrostatic transmissions. The construction of the hydrostatic transmissions 32 and 34 and the associated servomotors is well known to those skilled in the art and can take many different forms, for example the forms set forth in U.S. Pat. No. 3,142,964 to Thoma et al. and in application Ser. No. 645,194 filed on June 12, 1967, by Edward J. Bojas and now U.S. Pat. No. 3,448,578. Therefore, it is believed that further discussion of the structure of the hydrostatic transmissions 32 and 34 and their associated servomotors is not required at this time. Suffice it to say that the hydrostatic transmissions 32 and 34 are independently controlled by the manually operable actuator lever 46 to vary both the input to output speed ratios and the directions of operation of the hydrostatic transmissions.

The hydraulic control system 20 interconnects the actuator lever 46 and the hydrostatic transmissions 32 and 34 to enable the operation of each of the hydrostatic transmissions to be independently regulated in accordance with the positioning or setting of the actuator lever 46. To this end, the hydraulic control system 20 includes right and left control cylinder assemblies 56 and 58 which are connected by piston or connector rods 62 and 64 to the control valve and servomotor assemblies 50 and 52. Operation of the control cylinder assemblies 56 and 58 varies the condition or position of the control valve and servomotor assemblies 50 and 52 to operate the servomotors and thereby vary the direction of operation and input to output speed ratios of the associated hydrostatic transmissions.

The control cylinder assemblies 56 and 58 are operated by fluid conducted through hydraulic lines or conduits 72, 74, 76 and 78. These conduits are connected to opposite ends of the control cylinder assemblies and to right and left control assemblies 82 and 84. The control assemblies 82 and 84 regulate a flow or fluid from a source of pressure or pump 86 (FIG. 3) which is connected to the control assemblies by a conduit 90.

Operation of the actuator lever 46 moves the actuator lever about a universal joint or mounting 92 to move actuator or positioning members or shafts 94 and 96 which are connected to the actuator lever 46 by arms 98 and 100. This movement of the actuator members 94 and 96 operates the control assemblies 82 and 84 to vary the flow of fluid under pressure to the control cylinder assemblies 56 and 58. The control cylinders 56 and 58 in turn adjust the condition or position of control valves which are operatively associated with servomotors of the assemblies 50 and 52 for independently varying the drive or speed ratios of the hydrostatic transmissions 32 and 34 in accordance with known practices.

Figure 3:
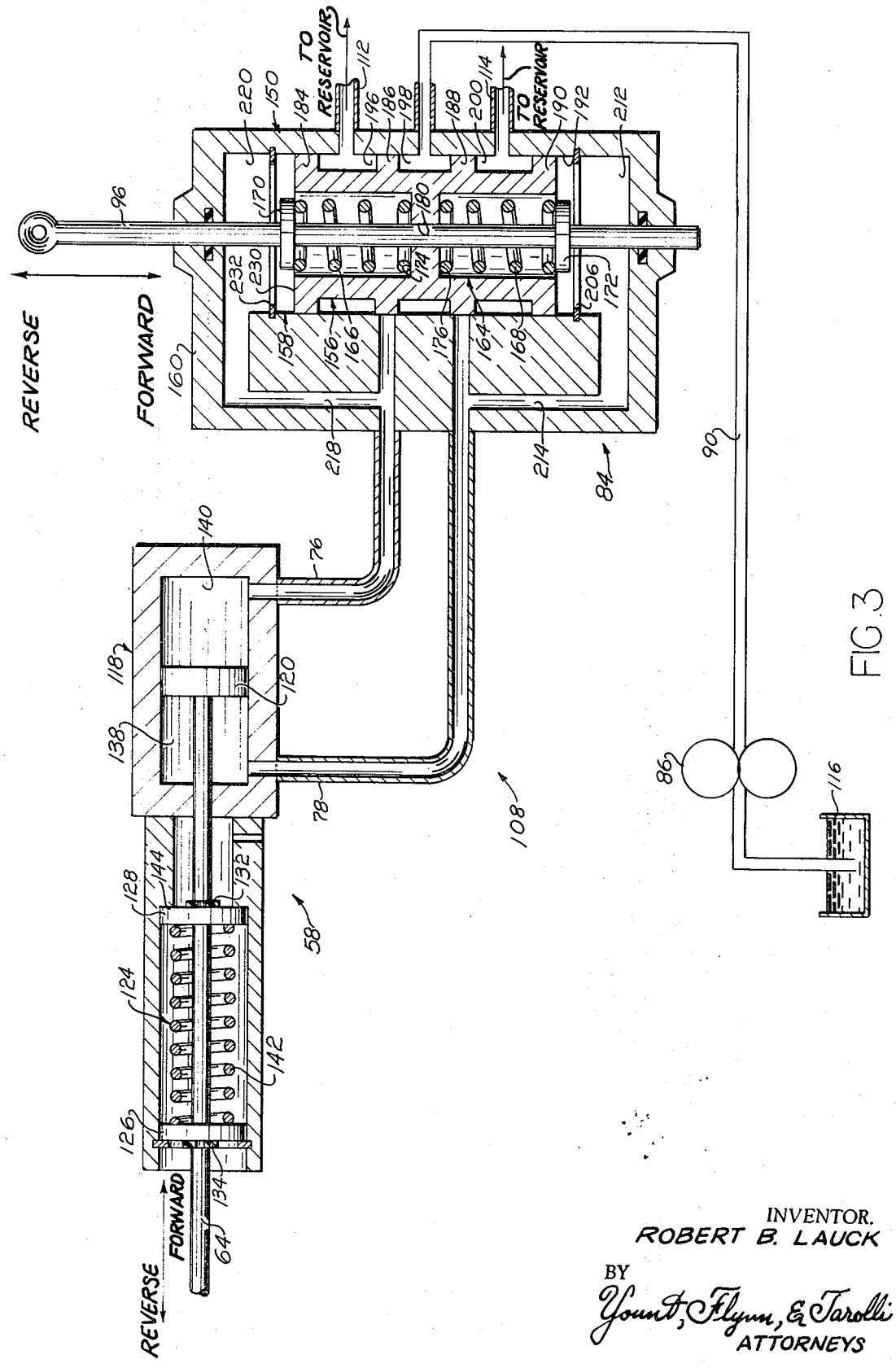
FIG. 3 is a schematic illustration of one portion or section of the hydraulic control system of FIG. 2, a valve assembly of the section of the control system being shown in an initial or neutral position.

The structure of the control cylinder assembly 58 and the control assembly 84 is disclosed more fully in FIG. 3. The control cylinder assembly 58 and control assembly 84 cooperate to form a control system 108, which is a portion of the control system 20, for regulating the operation of the left hydrostatic transmission 34. To this end the control assembly 84 is connected by the conduit 90 to the pump 86 and by conduits 112 and 114 to a reservoir 116. The control assembly 84 is also connected to opposite ends of a cylinder 118 of the control cylinder assembly 58 by the conduits 76 and 78. A piston 120 is slidably mounted in the cylinder 118 and is connected by the piston rod 64 to the assembly 52 (see FIG. 2). A double acting spring assembly 124 is connected to the piston rod 64 by spring seats or collars 126 and 128 which are slidably mounted on the piston rod 64 and limited in axial movement by stops 132 and 134 which are fixedly connected to the piston rod.

When the actuator lever 46 (FIG. 2) is moved in a forward direction, fluid under pressure is conducted into one end portion 138 of the cylinder 118 by the conduit 78 to move the piston 120 from the initial position of FIG. 3 toward the opposite end portion 140 of the cylinder 118. This movement of the piston 120 is resisted by a spring 142 of the spring assembly 124. As the piston 120 is moved, the spring 142 is compressed by movement of the spring seat 126 toward the spring seat 128 which abuts a stop shoulder 144. Movement of the piston rod 64 toward the right, as viewed in FIG. 3 also results in the servomotor control valve 52 (FIG. 2) being actuated to operate the hydrostatic transmission 34 in a forward direction. Fluid under pressure is conducted into the end portion 140 of the cylinder 118 to move the piston 120 in the opposite direction, that is toward the left as viewed in FIG. 3, to thereby actuate the servomotor control valve of the assembly 52 to operate the hydrostatic transmission 34 in the reverse direction.

The servomotor control valve of the assembly 52 is operable to different extents or conditions to thereby vary the extent to which the associated servomotor is operated and the ratio of input to output speed of the hydrostatic transmission 34. The extent of operation of the servomotor control valve of the assembly 52 is varied by the control cylinder assembly 58 in response to operation of the actuator lever 46 and control assembly 84. The control assembly 84 varies the extent of operation of the control cylinder assembly 58 causing the piston 120 to move from the initial position of FIG. 3 for a distance which is a function of the distance which the actuator lever 46 is moved from the neutral position of FIG. 2.

The control assembly 84 includes a valve assembly 150 which is connected by the actuator member 96 to the manually operable actuator lever 46. The valve assembly 150 is operated in response to movement of the actuator lever 46 to control the flow of fluid under pressure to the control cylinder assembly 58 to thereby regulate the operation of the associated hydrostatic transmission 34. To this end, the valve assembly 150 includes a valve member 156 which is slidably mounted in a chamber 158 in a housing 160. The valve member 156 is connected to the actuator shaft 96 by a spring assembly 164 having springs 166 and 168 which engage seats or stops 170 and 172 which are fixedly connected to the actuator shaft 96 and seats or shoulders 174 and 176 formed on the valve member 156 around an opening 180 through which the actuator shaft 96 extends. The opening 180 has a slightly larger diameter than the actuator shaft 96 to enable relative movement to occur between the actuator shaft 96 and the valve member 156 by compressing one of the springs 166 or 168.

The valve member 156 is operable from an initial position, shown in FIG. 3, blocking a flow of fluid to the control cylinder assembly 58 to a forward operated position, shown in FIG. 4. When the valve member 156 is in the forward operated position the end portion 138 of the control cylinder 118 is connected in fluid communication with the pump 86 through the conduits 78 and 90. Of course, this results in the piston 120 being moved toward the end portion 140 of a cylinder 118 to actuate the control valve and servomotor assembly 52 to operate the hydrostatic transmission 34 in the forward direction. Similarly, upward movement (as viewed in FIG. 3) of the actuator shaft 96 and valve member 156 relative to the housing 160 results in the end portion 140 of the control cylinder 118 being connected in fluid communication with the pump 86. This movement of the piston rod 64 operates the control valve and servomotor assembly 52 to operate the hydrostatic transmission 34 in the reverse direction.

The valve member 156 regulates a flow of fluid to the control cylinder 58 by connecting one end of the control cylinder assembly to the reservoir 116 through either the conduit 112 or 114 while connecting the other end of the control cylinder assembly 58 to the pump 86 through conduit 90. To provide this routing or directing of fluid flow, the valve member 156 includes a plurality of spaced apart annular sealing sections or lands 184, 186, 188 and 190 which extend around the valve member and sealingly engage a cylindrical side wall 192 of the chamber 158 A plurality of annular fluid passages 196, 198 and 200 are formed between the radially outwardly projecting lands 184, 186, 188 and 190. When the valve member 156 is in the initial or neutral position of FIG. 3, the lands 186 and 188 block the entrances to the conduits 76 and 78 to thereby block fluid flow between the control cylinder assembly 58 and the pump 86.

When the actuator shaft 96 is operated in the forward direction by movement of the actuator lever 46 (see FIG. 2), the valve member 156 is moved to the forward operated position illustrated in FIG. 4. In this position, the annular sealing section 190 of the valve member 156 engages a stop ring or member 206 which is fixedly mounted in the chamber 158. Continued movement of the actuator lever 46 and actuator shaft 96, after the valve member 156 has engaged the stop ring 206, results in a compression of the spring 166 while the spring 168 is at least partially released from its initial compressed condition of FIG. 3. Thus, the spring assembly 164 enables the actuator shaft 96 to be moved relative to the valve member 156 by compressing one of the springs of the spring assembly.

When the valve member 156 is in the forward operated position of FIG. 4, the pump 86 (FIG. 3) is connected in fluid communication with the end portion 138 of the control cylinder 118 through the conduit 90, the annular passage 198 between the lands 186 and 188 of the valve member 156, and the conduit 78. Fluid is then pumped under pressure from the conduit 90 through the valve assembly 150 to the end portion 138 of the control cylinder assembly 58. The end portion 140 of the control cylinder assembly 58 is exhausted to the reservoir 116 through the conduits 76 and 112. The conduit 76 is connected in fluid communication with the conduit 112 by the annular passages 196 formed between the lands 184 and 186 of the valve member 156. Therefore, the piston 120 can be moved toward the right, as viewed, in FIG. 3, under the influence of fluid pressure in the end portion 138 of the control cylinder 118 when the valve member 156 is in the forward operated position of FIG. 4. It should be noted that the spring assembly 124 of the control cylinder assembly 58 (FIG. 3) resiliently resists movement of the piston 120 from the initial position. The piston 120 is moved against the influence of the spring assembly 124 by fluid pressure which builds up in the end portion 138 of the cylinder and acts on the piston 120.

Movement of the piston 120 toward the end portion 140 of the cylinder 118 operates the servomotor control valve to increase the output speed of the hydrostatic transmission 34 to the associated track 26 of the tractor 22 (see FIGS. 1 and 2). In order to enable an operator of the tractor 22 to regulate the rate of forward motion of the tractor, it is desirable to be able to stop the movement of the piston 120 at a distance from the initial position of FIG. 3 which results in the desired rate of operation of the track 26. To this end, the end portion 138 of the cylinder 118 is connected in fluid commuication with an end portion 212 of the chamber 158 by passage 214 which is connected in fluid commuication with the conduit 78.

As the pressure in the end portion 138 of the cylinder 118 increases to overcome the increasing resistance of the spring assembly 124 to motion of the piston 120, the pressure in the end portion 212 of the chamber 158 increases to apply a pressure against the valve member 156 to move the valve member relative to the actuator shaft 96 from the forward operated position of FIG. 4 to the initial position of FIG. 5. A fluid passage 218 is provided to enable fluid to escape from the upper end portion 220 of the chamber 158 as the valve member is moved by fluid pressure in lower end portion 212 of the chamber. The passage 218 exhausts the upper end portion 220 of the chamber to the reservoir 116 through the conduit 76, the annular passage 196, and conduit 112. However, movement of the valve member 156 is resisted by the spring 166 which is further compressed by the upward, as viewed in FIGS. 4 and 5, movement of the valve member. Therefore, the valve member 156 is moved from the forward operated position of FIG. 4 to the initial position of FIG. 5 when the piston 120 of the control cylinder assembly 58 has been moved a sufficient distance from the initial position of FIG. 3 against the influence of the spring assembly 124 to provide a pressure build up in the end portion 138 of the control cylinder 118 and in the end portion 212 of the chamber 158 to move the valve member 156 upwardly (as viewed in FIG. 4) against the influence of the spring 166.

The fluid pressure which must be built up in the end portion 212 of the chamber 158, to move the valve member 156 from the forward operated position of FIG. 4 to the initial position of FIG. 5, is proportional to the distance which the actuator shaft 96 is moved downwardly relative to the valve member 158 by operation of the actuator lever 46. This proportionality results from the fact that the greater the movement of the actuator shaft 96 the greater is the initial compression of the spring 166 and the pressure which must be built up in the end portion 212 of the chamber 158 to move the valve member 156 against the influence of the spring 166. Accordingly, the greater the movement of the actuator lever 46 (see FIG. 2) and the actuator shaft 96 relative to the valve member 156, the greater is the distance through which the piston 120 must be moved to build up sufficient pressure in the end portion 138 of the control cylinder 118 by compressing the spring assembly 124 to move the valve member 156 against the force of the compressed spring 166 to the initial position of FIG. 5. Since movement of the piston 120 results in a proportional variation in the ratio of input speed to output speed of the hydrostatic transmission 34, operation of the actuator lever 46 results in a proportional variation in the speed ratio of the hydrostatic transmission 34.

After the hydrostatic transmission 34 has been adjusted by operation of the servomotor control valve and servomotor assembly 52, the valve member 156 remains in the initial position of FIG. 5 with the actuator shaft 96 displaced from its neutral or initial position of FIG. 3 to thereby maintain a substantially constant speed ratio through the hydrostatic transmission 34. When the actuator lever 46 is released, a return spring assembly 222 (see FIG. 2) moves the actuator lever 46 back toward the neutral position shown in FIGS. 2 and 4 from a side position. Movement of the actuator lever 46 to the neutral position also moves the actuator shaft 96 from the operated position of FIGS. 4 and 5 to the neutral or initial position of FIG. 3. The valve member 156 is then moved upwardly (as viewed in FIG. 5) to a reverse operated position wherein an end portion 230 of the valve member 156 is in engagement with the stop ring 232.

The valve member 156 is urged to the reverse operated position by the relatively high fluid pressure in the end portion 212 of the chamber 158. When the valve member 156 is in the reverse operated position, the conduit 78 is connected with the reservoir 116 through the annular passage 200 and conduit 114 to vent or exhaust the end portion 138 of the control cylinder 118. Similarly, the conduit 76 is connected in fluid communication with the pump 86 through the annular passage 198 and conduit 90 to increase the fluid pressure in the end portion 140 of the control cylinder 118. Therefore, movement of the valve member 156 to the reverse operated position enables the piston 120 to be moved to the initial position of FIG. 3 under the urging of both fluid pressure in the end portion 140 of the control cylinder 118 and the spring assembly 124.

As the piston 120 approaches the initial position of FIG. 3 the servomotor control valve 52 and associated servomotor are operated to the initial or neutral position to operate the hydrostatic transmission 34 to a neutral condition in which the hydrostatic transmission does not transmit power. In addition, as the piston 120 approaches the initial condition of FIG. 3, the pressure in the end portion 138 of the cylinder 118 is decreased while the pressure in the end portion 140 is increased. When the pressures in the two end portions 138 and 140 equalize, the equality in pressure is transmitted to both ends of the valve member 156 by the passages or conduits 214 and 218. The valve member 156 is then moved back to the initial position of FIG. 3 under the influence of the spring 166. The valve member 156 is then located in its initial relationship relative to the actuator shaft 96 and is positioned to block the flow of fluid to the control cylinder assembly 58.

When the actuator lever 46 is moved toward the reverse position, the actuator shaft 96 is moved upwardly (as viewed in FIG. 3) to reverse the previously described operation of the hydraulic control system 108. Thus, the upward movement of the actuator shaft 96 to the reverse operated position moves the end portion 230 of the valve member 156 into engagement with the stop ring 232. Continued upward movement of the actuator shaft 96 compresses the spring 168 to apply a pressure urging the valve member 156 into engagement with the stop ring 232. This spring pressure must be overcome by fluid pressure in the end portion 220 of the chamber 158 to move the valve member 156 from the reverse operated position to the initial position of FIG. 3. This fluid pressure is proportional to the distance which the piston 120 must be moved in the control cylinder 118 to compress the spring assembly 124 to thereby provide the requisite fluid pressure in the end portion 140 of the cylinder 118 and the end portion 220 of the chamber 158. Of course, the greater the extent of movement of the piston 120 from the initial position of FIG. 3, the greater is the extent of operation of the servomotor control valve 52 and associated servomotor and the greater is the increase in the output speed of the hydrostatic transmission 34 in the reverse direction. When the fluid pressure in the end portion 220 of the valve chamber 158 is sufficient to overcome the force of the spring 168, the valve member 156 is moved to the initial position to block the flow of fluid to the control cylinder 118 and to maintain the hydrostatic transmission in a condition to transmit power at a rate which corresponds to the setting or position of the actuator shaft 96.

When the manually operable actuator lever 46 is moved to the neutral position from the reverse position, the actuator shaft 96 is moved downwardly to the initial or neutral position of FIG. 3. The relatively high pressure in the end portion 220 in the chamber 158 then causes the valve member 156 to move to the forward operated position of FIG. 4. The relatively high pressure in the end portion 140 of the control cylinder 118 and in the end portion 220 of the chamber 158 is then vented to the reservoir 116 through the annular passage 196 and conduit 112. The piston 120 then moves toward the right (as viewed in FIG. 3) to the initial or neutral position. As the piston 120 approaches the initial position, the pressure in the end portions 138 and 140 of the cylinder 118 tend to equalize so that the fluid pressures to which the opposite ends of the valve member 156 are exposed tend to equalize. The valve member 156 is then moved from the forward operated position of FIG. 4 to the initial position of FIG. 3 by the spring 168.

As was previously mentioned, the control assembly 82 associated with right-hand hydrostatic transmission 32 and control cylinder assembly 56 is substantially the same structure as the left-hand control assembly 84 and control cylinder 58. The two control assemblies 82 and 84 are connected by the arms 98 and 100 to the actuator lever 46. Therefore, movement of the actuator lever 46 is effective to control the operation of both the hydrostatic transmissions 32 and 34 through the control assemblies 82 and 84. For example, if the actuator lever 46 is moved toward the left (as indicated by the arrow in FIG. 2) the valve member 156 for the control assembly 84 is moved from the initial or neutral position of FIG. 3 to the forward operated position of FIG. 4. This actuates the servomotor control valve and servomotor assembly 52 to adjust the hydrostatic transmission 34 to transmit power at an output speed in accordance to the extent of movement of the actuator shaft 96 by the actuator lever 46.

The leftward movement of the actuator lever 46 moves the valve member for the right-hand control assembly 82 upwardly (as viewed in FIG. 2) to the reverse operated position. This actuation of the control assembly 82 results in the control valve and servomotor assembly 50 being operated to adjust the hydrostatic transmission 32 to operate in the reverse direction and to transmit power at a speed which is a function of the movement of the actuator shaft 94 by actuator lever 46 from the initial or neutral position of FIG. 2. Thus, it can be seen that the actuator lever 46 can be manually operated to independently vary the direction of operation and speed ratio of each of the hydrostatic transmissions 32 and 34. Of course, the valve assembly 150, described above, may take different forms.

During operation of the tractor 22 (see FIG. 1) it is possible that the engine may approach a stall condition due to overloading of the engine. If such a stall condition is imminent or impending, it is desirable to decrease the load on the engine to prevent the engine from stalling. The reduction in the load on the engine should be accomplished in such a manner as to maintain the directional stability of the tractor 22. If the output speed of one of the hydrostatic transmissions 32 and 34 is decreased by a substantially greater percentage or fraction than is the output speed of the other transmission, the tractor 22 tends to swerve or turn toward the transmission experiencing the greater proportional or fractional reduction in speed. Moreover, if the tractor is turning, unequal percentage reductions will change the turning radius of the tractor.

Accordingly, an antistall system 250 is provided for reducing the output speed of each of the hydrostatic transmissions 32 and 34 by equal percentages to thereby maintain a substantially constant speed transmitting relationship between the transmissions while enabling the load on the transmissions to be reduced to thereby prevent stalling of the engine.

The antistall system 250 is shown schematically in FIG. 6 and in association with the hydraulic control system 108 for reducing the output speed of the hydrostatic transmission 34 when a stall condition is impending or imminent. A similar antistall system is associated with the control assembly 82 and control cylinder assembly 56 for effecting a reduction in the output speed of the hydrostatic transmission 32 by a percentage which is equal to the percentage reduction in the speed effected for the hydrostatic transmission 34. Since the two antistall systems are substantially identical, only the antistall system 250 has been illustrated in FIG. 6.

The antistall system 250 effects a reduction in the output speed of the hydrostatic transmission 34 by changing the relationship between the actuator shaft 96 and the valve member 156. This results in the valve member being moved to one of the two operated positions to enable the piston 120 of the control cylinder assembly 58 to move toward the neutral position. This movement of the piston 120 at least partially reverses a previous operation of the hydraulic control system 108 to effect the requisite change in the speed ratio of the associated hydrostatic transmission 34.

The antistall system 250 includes an antistall cylinder assembly 254 which is pivotally mounted at 256 and connected to the actuator lever 46 by a link 258. The antistall cylinder assembly 254 is also connected to the actuator rod 96 by a link 260. The antistall cylinder assembly 254 includes a cylinder 264 in which a piston 266 having a rod 268 is slidably mounted. The piston 266 is normally forced to an extended position (shown in FIG. 6) against the influence of a spring 270 by fluid pressure in the cylinder 264. The link 258 is pivotally connected at 274 to the cylinder 264 and at 276 to the arm 100 so that movement of the manually operable actuator lever 46 results in the cylinder 264 being pivoted at 256. This movement of the cylinder 264 results in the piston rod 268 being moved either upwardly or downwardly to thereby move the link 260, which is pivotally connected to the piston rod at 280 and to the actuator shaft at 284, and effect movement of the actuator shaft 96.

A sensor assembly 290 is provided for detecting an impending stall condition of the engine. To this end, the sensor assembly 290 is associated with a shaft 294 which is driven at a rate proportional to the rate of operation or speed of the engine. When a stall condition is imminent, the rate of rotation of the shaft 294 is decreased due to a slowing down of the engine. Speed responsive elements or weights 296 are mounted on levers 298 which are pivotally mounted at 300 and rotated with the shaft 294. When the shaft is rotating at a normal operating speed for a particular setting of a throttle 302 the weights are urged outwardly to the position shown in FIG. 6 by centrifugal force. When a stall condition is imminent, the rate of rotation of the shaft 294 is decreased and the centrifugal force acting on the weights 296 is also decreased. A spring 304 then presses a cylinder 306 against downwardly projecting actuator sections or ears 310 which are fixedly connected to the levers 398 to move the weights 296 to the position shown in FIG. 7.

A pressure cylinder assembly 312 is located adjacent to one end of the shaft 294. The pressure cylinder assembly 312 includes a valve member 314 which is slidably mounted in a cylinder 316 for movement between a closed position shown in FIG. 6 and an open position shown in FIG. 7. When the valve member 314 is in the open position of FIG. 7 fluid flows from the cylinder 254 through conduits 320 and 322 to the reservoir 116. The piston 266 then moves inwardly under the influence of the spring 270 to the retracted position of FIG. 7.

Movement of the valve member 314 from the open position of FIG. 7 to the closed position of FIG. 6 blocks the flow of fluid to the reservoir 116 and forces fluid under pressure to flow from the end portion 323 of the cylinder 316 to the conduit 320 through a conduit 324. The fluid pressure in the conduit 320 is transmitted to the cylinder 264 to press the piston 266 outwardly from the retracted position of FIG. 7 to the extended position of FIG. 6.

The valve member 314 is moved from the open position to the closed position against the influence of a spring 326 by movement of the weights 296 when the shaft 294 begins to rotate at its normal speed. To this end, an actuator pin 330 is connected to the cylinder 306 and extends into the cylinder 316. When the shaft 294 begins to rotate at its normal speed, the weights 296 are moved outwardly by centrifugal force from the position shown in FIG. 7 to the position shown in FIG. 6. The cylinder 306 is then moved outwardly by the arms 310 to slide the valve member 314 from the open position (FIG. 7) to the closed position (FIG. 6) against the influence of the spring 326. In addition, the end portion of the pressure cylinder assembly 316 opposite from the spring 326 is connected by a conduit 334 to the pump 86 to thereby apply a fluid pressure force against the valve member 314 and spring 328. As the valve member 314 moves to the closed position, it forces fluid under pressure into the conduit 320 to move the piston 266 against the influence of the spring 270.

If a stalling of the engine associated with the hydrostatic transmissions 32 and 34 becomes imminent with the transmission 34 operating in a forward direction, the rate of rotation of the shaft 294 is decreased and the valve member 314 is moved to the open position to exhaust the cylinder 264 of the antistall cylinder assembly 254 to the reservoir 116. The spring 270 then moves the piston 266 inwardly to the retracted position shown in FIG. 7. This inward movement of the piston 266 results in the link 260 and an actuator shaft 96 being moved toward the pivot connection 256. The spring 166 of the control assembly 84 is then at least partially released from the compressed condition of FIG. 5 so that the valve member 156 is moved from the initial position of FIG. 5 to the reverse operated position by fluid pressure in the end portion 212 of the chamber 158. This movement of the valve member 156 vents the end portion 138 of the cylinder 118 to the reservoir 116.

The piston 120 of the control cylinder assembly 58 is then moved toward the initial position to operate the control valve and servomotor assembly 52 to decrease the output speed of the hydrostatic transmision 34. The amount by which the output speed is reduced is proportional to the distance through which the control cylinder assembly piston 120 is moved towards its initial position and the distance which the actuator shaft 96 is moved relative to the valve member 156. The distance which the actuator shaft 96 is moved for a given movement of the piston 266 of the antistall cylinder assembly 254 varies with the arcuate distance through which the antistall cylinder assembly had previously been pivoted by operation of the actuator lever 46. Thus, when the antistall cylinder assembly 254 has been moved through a relatively small arcuate distance from the position shown in FIG. 6, there is a relatively small upward movement of the actuator shaft 96 upon movement of the piston 266 to the retracted position. Similarly, when the antistall cylinder assembly 254 has been pivoted through a relatively large distance, for example to the position shown in dashed lines in FIG. 6, movement of the piston 266 to the retracted position results in a relatively large movement of the actuator shaft 96. Thus, the distance through which the actuator shaft 96 is moved upon operation of the antistall system 250 is directly proportional to the extent to which the control assembly 84 was operated by previous movement of the actuator lever 46 and actuator shaft 96. However, the output speed of the hydrostatic transmission 34 is proportional to the extent which the control assembly 84 is operated. Therefore, upon operation of the antistall system 250 the swash angle is reduced to a new setting which is within the operational capabilities of the engine. The output speed of the hydrostatic transmission 34 is thereby reduced by an amount which is proportional to the output speed and swash angle at the time of operation of the antistall system 250.

As was previously mentioned, an antistall system, similar to the antistall system 250, is associated with the hydraulic control system for the hydrostatic transmission 32. This antistall system for the hydrostatic transmission 32 can be operatively connected with the pressure cylinder 316 of the sensor assembly 290. When a stall condition is imminent, the antistall system associated with the hydrostatic transmission 32 is operated contemporaneously with the antistall system 250 to reduce the output speed of the hydrostatic transmission 32. The output speed of the hydrostatic transmision 32 is reduced by an amount which is proportional to the extent of operation of the control assembly 82 and the output speed of the hydrostatic transmission 32 immediately before operation of the associated antistall system. Since the output speeds for the hydrostatic transmissions 32 and 34 are both reduced by amounts which are equal percentages or equal proportions of the rate at which each transmission was transmitting power immediately before operation of the associated antistall systems, the speed relationship between the hydrostatic transmissions 32 and 34 will be the same after operation of the antistall systems as it was before operation of the antistall systems. However, the output speed of each of the hydrostatic transmissions 32 and 34 is reduced by operation of the antistall systems to prevent stalling of the engine.

Figure 8:
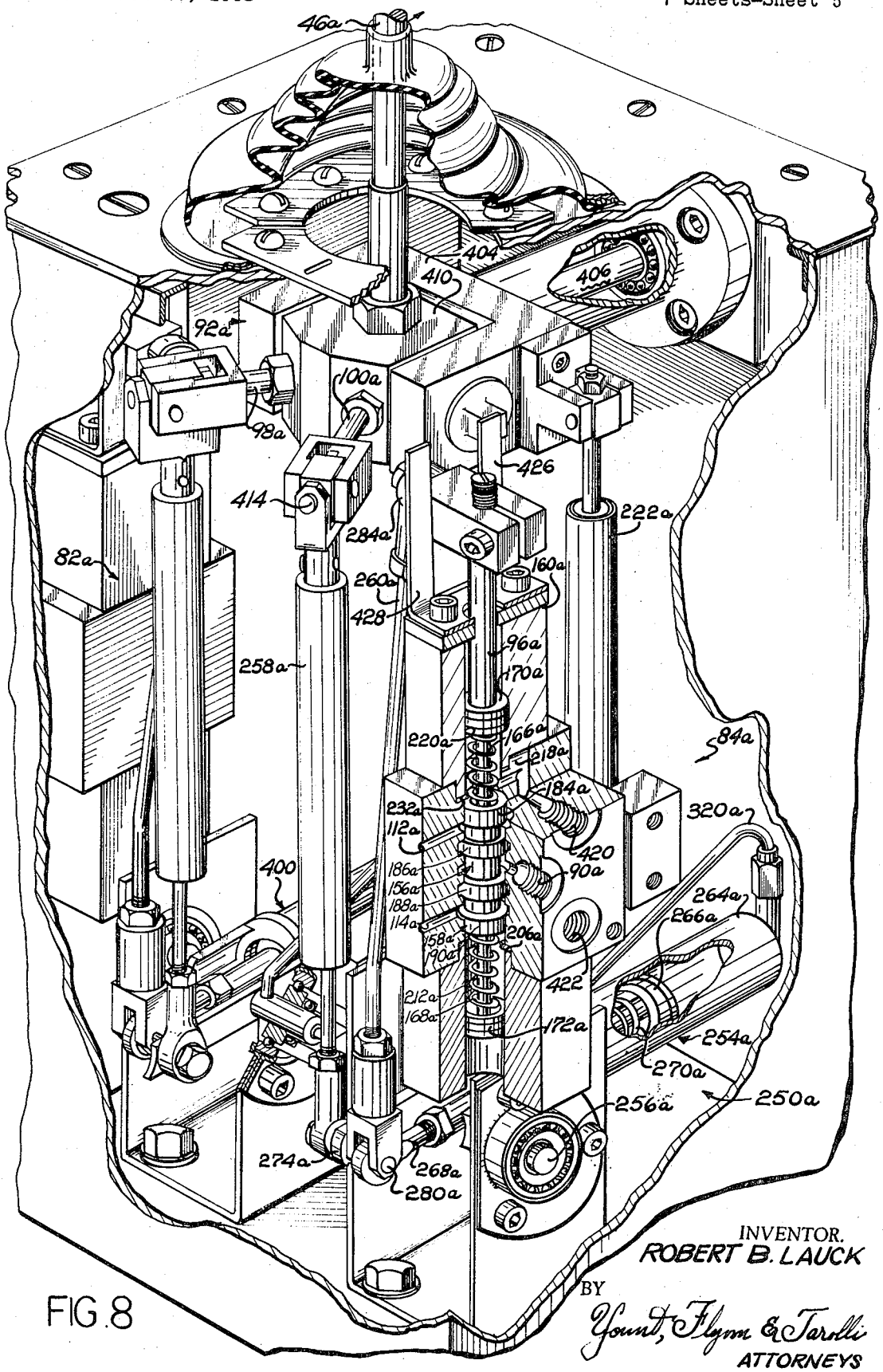
FIG. 8 is a partially broken away elevational perspective view illustrating one embodiment of the hydraulic control system.

An illustrative embodiment of the left and right hand hydraulic control assemblies and the associated antistall assemblies are illustrated in FIG. 8. Since the embodiment of the invention illustrated in FIG. 8 is constructed in accordance with the schematic illustrations of FIGS. 1–7, structural elements have been given numerical designations in FIG. 8 which are the same as numerical designations given to corresponding elements in FIGS. 1–7.

To avoid confusion, the suffix letter *a* has been added to the numerical designations of FIG. 8.

The structure of a control assembly 84a and the associated antistall system 250a is extensively illustrated in FIG. 8. Of course, the structure of a control assembly 82a and associated antistall system 400 are substantially the same as the structure of the control assembly 84a and antistall system 250a. A manually operable actuator lever 46a is connected to a universal mounting assembly 92a. The universal mounting assembly 92a includes a yoke 404 which is connected to a shaft 406 and is pivotal about a longitudinal axis of the shaft 406. A block 410 is pivotally connected to the arms of the yoke 404 for pivoting movement about an axis extending perpendicular to the longitudnal axis of the shaft 406. It will be apparent to those skilled in the art that the structure of the mounting 92a enables the actuator lever 46a to be moved in any desired direction from the neutral position in which it is shown.

The antistall system 250a is connected to the block 410 of the mounting assembly 92a by a link 258a. The link 258a is pivotally connected at 414 to an arm 100a extending outwardly from the block 410. The opposite end of the link 258a is pivotally connected at 247a to an outwardly extending projection of a cylinder 264a of an antistall cylinder assembly 254a. The antistall cylinder 264a is pivotally mounted at 256a.

A piston 266a of the antistall cylinder assembly 254a is pivotally connected at 208a to a link 260a. The link 260a is in turn pivotally connected at 284a to an actuator shaft 96a of the hydraulic control assembly 84a. A valve member 156a is slidably mounted on the actuator shaft 96a and is movable to a forward operated position in engagement with a stop ring 206a and a reverse operated position in engagement with a stop ring 232a. The control assembly 84a is connected to a suitable control cylinder assembly, similar to the control cylinder assembly 58 of FIG. 3, by conduits (not shown) which are adapted to engage threaded connections 420 and 422 formed in a housing 160a having a chamber 158a in which the valve member 156a is slidably mounted. A pair of upstanding guide arms or ears 426 and 428 are fixedly connected to the housing 160a to guide the movement of actuator rod 96a relative to the housing.

During operation, the actuator lever 46a is manually operated to actuate the hydraulic control assemblies 82a and 84a. If the hydrostatic transmissions associated with the control assemblies 82a and 84a are to be operated in a reverse direction, the actuator lever 46a is moved rearwardly as indicated by the arrow in FIG. 8. Rearward movement of the actuator lever 46a pivots the block 410 to move arms 98a and 100a upwardly (as viewed in FIG. 8) to pivot the antistall cylinder 264a about the axis 256a. This movement of the antistall cylinder 264a is transferred by the link 260a to the actuator shaft 96a. The actuator shaft 96a is moved upwardly (as viewed in FIG. 8) to move the valve member 156a to the reverse operated position, that is to move the valve member 156a into engagement with the stop ring 232a.

Continued rearward movement of the actuator lever 46a results in the actuator shaft 96a being moved relative to the valve member 156a to compress the spring 168a. When the valve member 156a is in the reverse operated position, the associated control cylinder assembly (not shown) is extended to operate a servomotor control valve to adjust the rate of power transmission by the associated hydrostatic transmission. When the pressure in the associated control cylinder assembly and in an end portion 220a of the chamber 158a is equal to the pressure exerted by the spring 168a, the valve member 156a is moved relative to the actuator shaft 96a from the reverse operated position to the initial position of FIG. 8. The flow of fluid to the associated control cylinder assembly (similar to the control cylinder assembly 58 of FIG. 3) is then blocked by the valve member 156a. Of course, the control assembly 82a is operated contemporaneously with the control assembly 84a to adjust an associated right hand hydrostatic transmission.

If the engine of the vehicle should approach a stall condition, the antistall systems 250a and 400 are operated to effect substantially proportional reductions in the output speeds of the right and left hydrostatic transmissions to thereby maintain a substantially constant speed ratio relationship between the two hydrostatic transmissions while reducing a load on the engine to thereby prevent stalling of the engine. Thus, when a stall condition is imminent the pressure in the antistall cylinder 264a is reduced by a sensor assembly (similar to the sensor assembly 290 of FIG. 6) which is operative to sense an impending stalling of the engine. The reduction of pressure in the cylinder 264a enables the piston 266a to be retracted into the cylinder by a spring 270a. This movement of the piston 266a results in a corresponding movement of the piston rod 268a which pulls the link 260a downwardly to partially reverse the previous operation of the actuator shaft 96a. The extent to which the actuator shaft 96a is moved by the operation of the antistall system 250a is substantially proportional to the extent to which the actuator shaft 96a was previously operated by the movement of the actuator lever 46a. This proportionality results of the fact that the antistall cylinder 264a is pivotally mounted for movement upon an axis 256a so that the piston rod 260a is moved in a direction which is substantially perpendicular to the axis of rotation of the cylinder 264a.

The operation of the antistall system 400 is substantially the same as the previously explained operation of the antistall system 250a. Thus, the antistall systems 250a and 400 are contemporaneously operated to independently and proportionally reduce the output speed of the associated hydrostatic transmissions. The output speed of each hydrostatic transmission is reduced by an amount proportional to the output speed immediately before the operation of the antistall systems. Therefore, the output speed relationship between the hydrostatic transmissions 32 and 34 is the same after operation of the associated antitall systems as before operation of the antistall systems.

When the engine is again operating at normal speed, the sensor assembly for the antistall systems 250a and 400 is operated to again force fluid under pressure into the antistall cylinders to move the actuator shafts of the associated control assemblies 82a and 84a back to the positions in which they were located before operation of the antistall systems. Of course, this movement of the actuator shafts results in the associated hydrostatic transmission being adjusted to increase the output speed by an amount which is equal to the previous decrease in the output speed.

As the lever 46a is returned to the neutral position, the arms 98a and 100a are moved downwardly to pivot the antistall cylinders back to the initial position shown in FIG. 8. The actuator shaft 96a of the control assembly 84a is then moved downwardly (as viewed in FIG. 8) relative to the housing 160a. Fluid pressure in the end portion 220a of the chamber 158a moves the valve member 156a with the actuator shaft 96a until the valve member engages the stop ring 206a and is located in a forward operated position. The actuator shaft 96a is then moved relative to the valve member 156a to decompress or release the spring 168a. When the piston of the associated control cylinder assembly (similar to the piston 120 of the control cylinder assembly 58) returns to the initial position, the pressure in the opposite ends of the chamber 158a is equalized so that the spring 168a moves the valve member 156a back to the initial position shown in FIG. 8. The valve member 156a will remain in the initial position until the actuator lever 46a is again operated.

Figure 9:
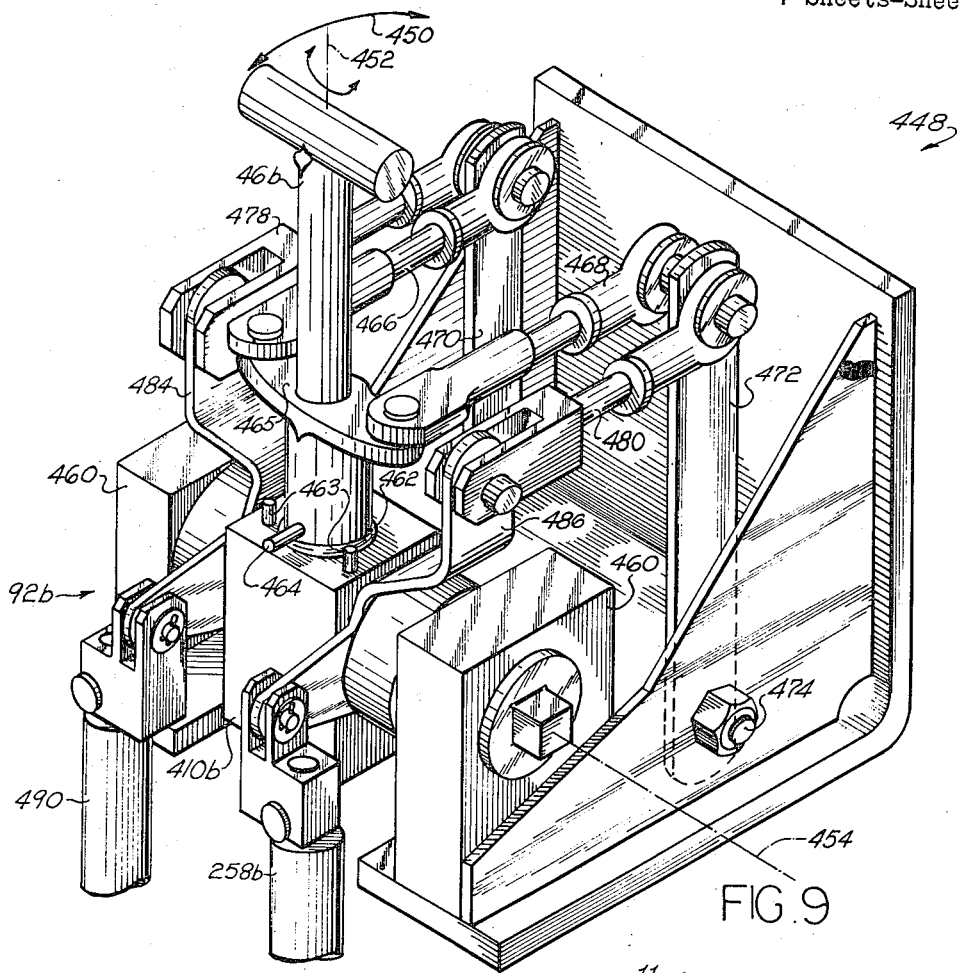
FIG. 9 is a partially broken away perspective view illustrating a portion of another embodiment of an actuator assembly for the hydraulic control system.

Another embodiment of the actuator assembly for operating the hydraulic control assembly is illustrated in FIG. 9. Since the embodiment illustrated in FIG. 9 is somewhat similar to the embodiment illustrated in FIG. 8 and is constructed in accordance with the schematic illustrations of FIGS. 1–7, structural elements have been given numerical designations in FIG. 9 which are the same as the numerical designations given to corresponding elements in FIGS. 1–8. To avoid confusion, the suffix letter $b$ has been added to the numerical designations of FIG. 8.

The actuator assembly 448 of FIG. 9 includes an actuator handle or lever 46$b$ which is illustrated in a neutral position and is movable in either a forward or reverse direction (as illustrated by the arrow 450 in FIG. 9). This movement of the actuator lever 46$b$ selectively increases or decreases the output speed of two hydrostatic transmissions which are associated with the actuator assembly 448. By rotating the actuator lever 46$b$ about a central longitudinal or vertical axis 452 the output speed of each of the hydrostatic transmission is varied to cause the associated vehicle to turn in the previously explained manner. It should be noted that the actuator lever 46$b$ is pivotal in a forward or reverse direction about a horizontal or transverse axis 454 while being retained against side wise pivoting movement. Thus, the actuator lever 46$b$ is not universally movable as is the actuator lever 46$a$ of FIG. 8. The actuator lever 46$b$ is rotated about the longitudinal or vertical axis 452 to vary the output speeds of the hydrostatic transmissions relative to each other while the actuator lever 46$a$ is pivoted sidewardly to vary the output speeds of the hydrostatic transmissions relative to each other.

To transmit this movement of the actuator lever 46$b$ to the associated control cylinder assemblies and hydrostatic transmissions (similar to those illustrated in FIGS. 1–7), the actuator lever 46$b$ is connected to a mounting assembly 92$b$ having a block 410$b$ pivotally supported by side sections 460. The actuator lever 46$b$ is rotatably journaled at 462 in the block 410$b$ for rotation about the axis 452. Stop pins 463 cooperate with a pin 464 to limit rotation of the actuator lever 46$b$ from the neutral position. A flange section 465 is pivotally connected at opposite ends by links 466 and 468 to arms 470 and 472 which are pivotally supported at 474 (the pivot support for only the arm 472 being shown) and pivotally connected by links 478 and 480 to brackets 484 and 486 which are mounted for pivoting movement about the transverse axis 454. Links 258$b$ and 490 are pivotally connected to the brackets 484 and 486 to connect the actuator assembly of FIG. 9 to control assemblies, similar to the control assemblies 82 and 84 of FIGS. 1–7.

In view of the foregoing description, it will be apparent that when the actuator lever 46$b$ is moved in a forward or reverse direction, as indicated by the arrow 450, the output speed of the associated hydrostatic transmissions is increased in either the forward or reverse direction depending upon the direction of movement of the actuator lever 46$b$ from the neutral position. This movement of the actuator lever 46$b$ results in a pivoting of the block 410$b$ and flange section 465 about the axis 454. This pivoting movement of the flange 465 operates the links 466, 468, 478 and 480 to pivot the brackets 484 and 486 about the transverse axis 454. The movement of the brackets 484 and 486 is transmitted by the links 490 and 258$b$ to the associated control assemblies (not shown). Of course, movement of the links 490 and 258$b$ operates the control assemblies in a manner previously explained in connection with FIGS. 1–8. In addition, antistall systems, similar to the antistall systems 250$a$ and 400 of FIG. 8, are associated with the control assemblies and links 490 and 58$b$ of FIG. 9 to reduce the output speed of the hydrostatic transmissions when an impending stall condition is present.

Figure 10:
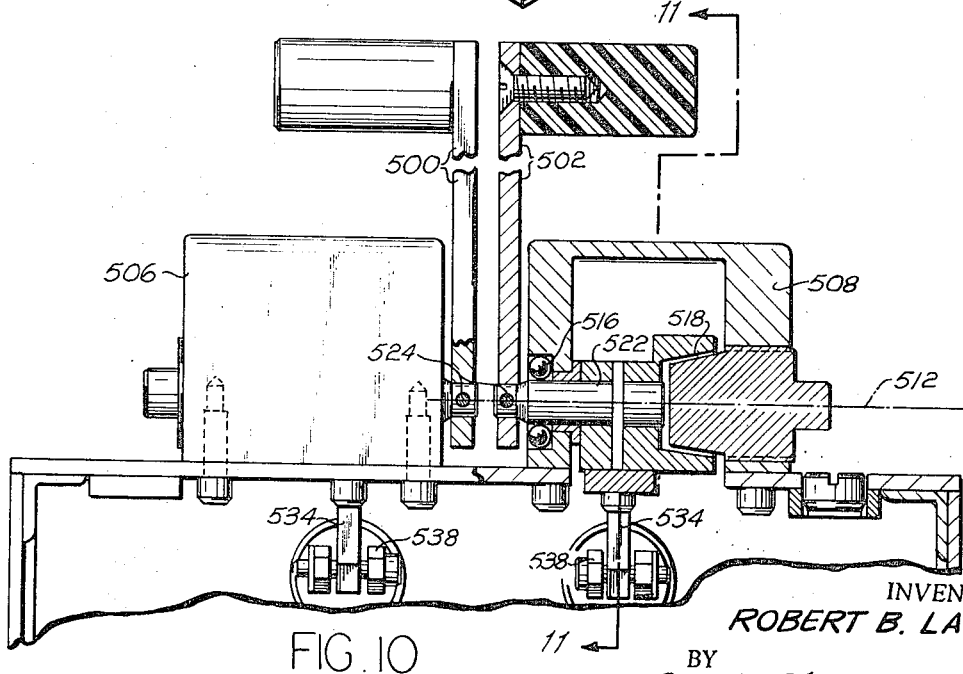
FIG. 10 is a sectional view, taken along the line 10—10 of FIG. 11, of still another embodiment of the actuator assembly for the hydraulic control system.
Figure 11:
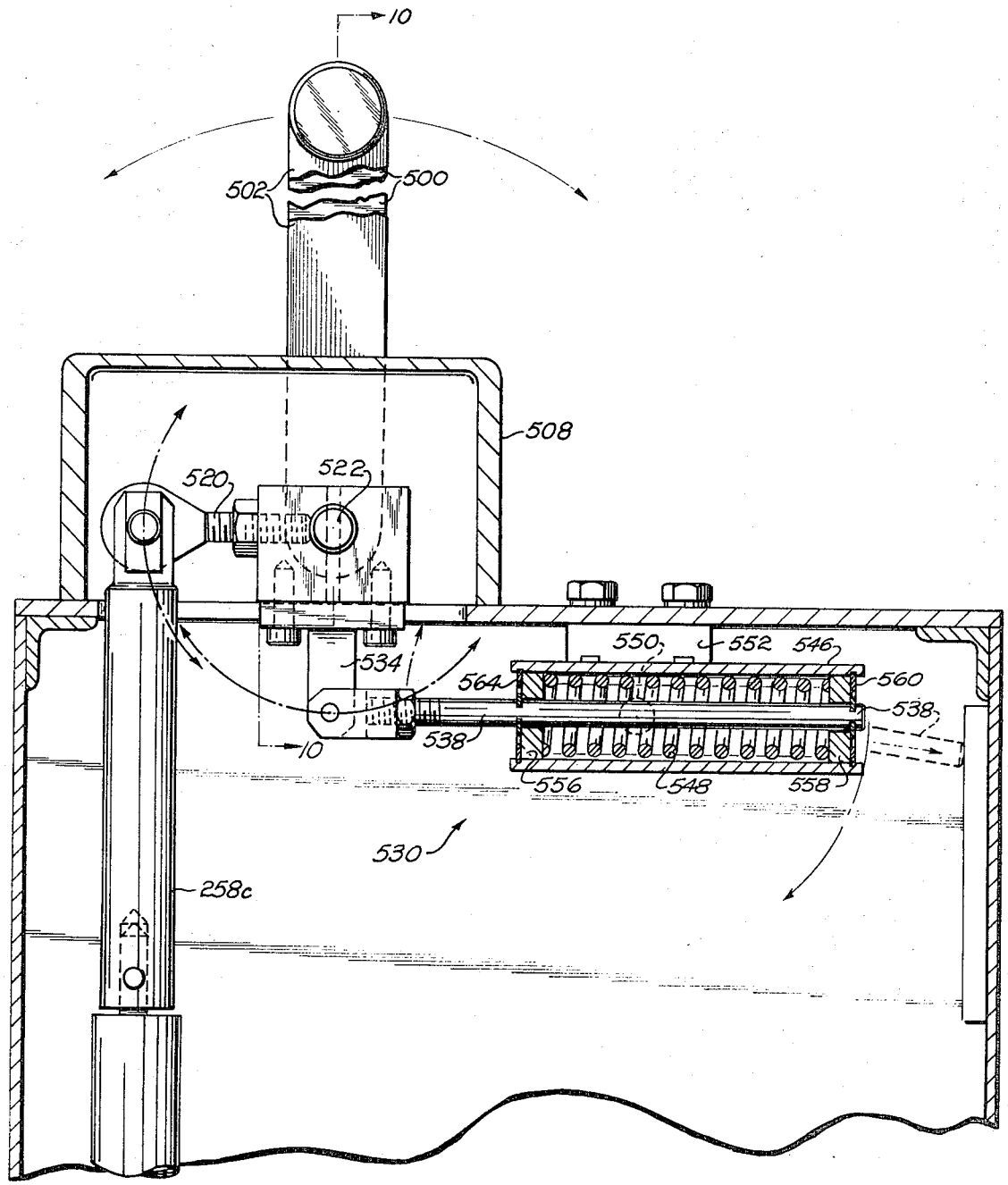
FIG. 11 is a sectional view taken along the line 11—11 of FIG. 10.

Another embodiment of the actuator assembly is illustrated in FIGS. 10 and 11. Since the embodiment of the invention illustrated in FIGS. 10 and 11 was generally similar to the embodiment previously described in connection with FIGS. 1–9, structural elements have been given numeral designations in FIGS. 10 and 11 which are the same as numerical designations given to corresponding elements in FIGS. 1–9. To avoid confusion, the suffix letter $c$ has been added to the numerical designations of FIGS. 10 and 11.

In the embodiment of the actuator assembly illustrated at FIGS. 10 and 11, two control or actuator levers 500 and 502 are provided for controlling the operation of control assemblies, similar to the control assemblies 82 and 84 of FIGS. 1–7, to vary the direction of operation of a pair of associated hydrostatic transmissions and the ratio of the input speed to output speed of the hydrostatic transmissions. Accordingly, the actuator levers 500 and 502 are pivotally supported on housings 506 and 508 for pivoting movement about a common transverse axis 512. When the actuator lever 502 is moved in a forward direction from the illustrated neutral position, the output speed of an associated hydrostatic transmission in a forward direction is increased. Conversely, when the actuator lever 502 is moved in a rearward direction from the neutral position, the output speed of the associated hydrostatic transmission is increased in the reverse direction. Of course, movement of the actuator lever 500 from the neutral position shown results in a similar variation in the output speed of an associated hydrostatic transmission.

Since the actuator levers 500 and 502 are operatively connected with the associated hydrostatic transmissions through similar linkages and control assemblies, only the linkage assembly for the hydrostatic transmission 502 will be fully described, it being understood that a similar linkage assembly is associated with the actuator lever 500. The actuator lever 502 is pivotally supported by bearing assemblies 516 and 518 supported on side walls of the housing 508. Outwardly extending arm 520 (FIG. 11) is pivotally connected to a link 258$c$ which is in turn connected to a control assembly (not shown) similar to the control assembly 84$a$ of FIG. 8. The arm 520 is fixedly connected to a transversely extending shaft 522 which is in turn secured by a pin 524 (FIG. 10) to the actuator lever 502. Thus, pivoting movement of the actuator lever 502 about the transverse axis 512 pivots the arm 520 and link 258$c$ through a corresponding distance to vary the ratio of the input to output speed of the associated hydrostatic transmission.

A double acting return assembly 530 (FIG. 11) is connected to the actuator lever 502 by a downwardly projecting arm 534 which is fixedly connected to the shaft 522. The downwardly extending arm 534 is connected to a push rod or shaft 538 of the return spring assembly. The push rod 538 is associated with a piston 542 which is slidably mounted in a cylinder 546 for movement against the influence of a spring 548. The cylinder 546 is pivotally mounted at 550 on a bracket 552.

The actuator lever 502 is normally urged toward the neutral position by the return spring assembly 530. However, when the actuator lever 502 is pivoted in a forward direction, an end section 556 compresses the spring 548 against an opposite end section 558 and retaining ring 560. The cylinder 546 is then pivoted in a clockwise direction about the pivot mounting 550 (as indicated by the arrow in FIG. 11). As the spring 548 is compressed, the shaft 538 slides through an opening in the end section 558 to the position indicated in dashed lines in FIG. 11. Similarly, when the actuator lever 502 is pivoted in the reverse direction, the end section 558 is moved toward the left (as viewed in FIG. 11) to compress the spring 548 against the end section 556 and lock ring 564.

From the preceding description it is apparent that the actuator lever 502 is moved in a forward or reverse direction against the influence of the return spring assembly 530, the link 258$c$ transmits the motion to an associated control assembly to vary the ratio of the input speed to output speed of the associated hydrostatic transmission. Of course, an antistall system, similar to the antistall system 250a can be associated with the control assemblies for the actuator levers 500 and 502.

In view of the foregoing description, it can be seen that I have provided a new and improved hydraulic control system 20 for independently regulating the operation of a plurality of hydrostatic transmissions 32 and 34. The hydraulic control system 20 is associated with a single manually operable actuator lever 46 which is selectively moved to control both the direction of operation of the associated hydrostatic transmissions and the ratio of input to output speed of the associated hydrostatic transmissions. In addition, antistall systems 250 and 400 have been provided for effecting substantially proportional reductions in the output speeds of the hydrostatic transmissions when an impending stall condition is present. By providing for proportional reductions in the output speed of the hydrostatic transmissions, the antistall systems enable the ratio of input speed to output speed to be varied while maintaining substantially constant the speed ratio relationship between the hydrostatic transmissions.

Although particular embodiments of the hydraulic control system 20 have been illustrated in the drawings, it will be apparent to those skilled in the art that many changes and modifications can be made in the hydraulic control system. Therefore, it is contemplated to cover by the appended claims any such changes and modifications as fall within the true spirit and scope of the invention.

What is claimed is:

1. Apparatus for controlling the operation of a plurality of hydrostatic transmissions, said apparatus comprising a first hydraulic control means operatively associated with one of said hydrostatic transmissions for controlling the operation of said one hydrostatic transmission, a second hydraulic control means operatively associated with another of said hydrostatic transmissions for controlling the operation of said other hydrostatic transmission, each of said control means functioning to control the operation of its respective hydrostatic transmission independently of the operation of the other hydrostatic transmission, an actuator member operatively connected to said first and second hydraulic control means for selectively operating said first and second hydraulic control means to thereby regulate the operation of said hydrostatic transmissions, and first and second antistall means operatively associated with said first and second hydraulic control means respectively and with a source of power operatively associated with said hydrostatic transmissions, said first and second antistall means being operable to at least partially reverse the operation of each of the hydraulic control means by substantially proportional amounts when said source of power is tending to stall to thereby effect a reduction in the output speed of each of said hydrostatic transmissions to reduce the stalling tendency of said source of power while maintaining a substantially constant output speed relationship between said hydrostatic transmissions.

2. Apparatus for controlling the operation of a plurality of hydrostatic transmissions, said apparatus comprising a first hydraulic control means operatively associated with one of said hydrostatic transmissions for controlling the operation of said one hydrostatic transmission, a second hydraulic control means operatively associated with another of said hydrostatic transmissions for controlling the operation of said other hydrostatic transmission, each of said control means functioning to control the operation of its respective hydrostatic transmission independently of the operation of the other hydrostatic transmission, and an actuator member operatively connected to said first and second hydraulic control means for selectively operating said first and second hydraulic control means to thereby regulate the operation of said hydrostatic transmissions, said first hydraulic control means being operable between a first condition in which said one hydrostatic transmission is operated in one direction and a second condition in which said one hydrostatic transmission is operated in a direction opposite to said one direction and said second hydraulic control means is operable between a first condition in which said other hydrostatic transmission is operated in one direction and a second condition in which said other hydrostatic transmission is operated in a direction opposite to said one direction of operation for said other hydrostatic transmissions, said actuator member being selectively operable to both separately and contemporaneously operate said first and second hydraulic control means between their respective first and second conditions to thereby enable the direction of operation of said hydrostatic transmissions to be controlled by operation of said actuator member.

3. Apparatus for controlling the operation of a plurality of hydrostatic transmissions, said apparatus comprising a first hydraulic control means operatively associated with one of said hydrostatic transmissions for controlling the operation of said one hydrostatic transmission, a second hydraulic control means operatively associated with another of said hydrostatic transmissions for controlling the operation of said other hydrostatic transmission, each of said control means functioning to control the operation of its respective hydrostatic transmission independently of the operation of the other hydrostatic transmission, and an actuator member operatively connected to said first and second hydraulic control means for selectively operating said first and second hydraulic control means to thereby regulate the operation of said hydrostatic transmissions, said first and second hydraulic control means each including a cylinder assembly operatively connected with an associated hydrostatic transmission, and a valve means connected in fluid communication with said cylinder assembly and a source of fluid under pressure for regulating a flow of fluid from said source of fluid under pressure to said cylinder assembly, said actuator member being operatively connected to said valve means for varying the condition of said valve means to thereby control said flow of fluid from said source of fluid under pressure to said cylinder assembly, said cylinder assembly including a first spring means for urging a piston of said cylinder assembly to one position relative to a cylinder assembly, and said valve means including a valve member movably mounted in a chamber for separating said chamber into a plurality of portions which are connected in fluid communication with opposite end portions of said cylinder and a second spring means for urging said valve member to one position relative to said actuator member, said actuator member being selectively operable to move said valve member from a first position to a second position in said chamber to thereby connect one of said portions of said cylinders and one of said portions of said chamber in fluid communication with said source of fluid under pressure, said valve member being moved relative to said actuator member from said second position to said first position in said chamber against the urging of said second spring means by fluid pressure in said one portion of said chamber when said piston has been moved in said cylinder from said one position to another position against the urging of said first spring means by fluid pressure in said one end portion of said cylinder, said piston being moved in said cylinder from said one position to said other position through a distance which is a function of a distance through which said actuator member is moved when operating said valve means.

4. Apparatus for controlling the operation of a plurality of hydrostatic transmissions, said apparatus comprising a first hydraulic control means operatively associated with one of said hydrostatic transmissions for controlling the operation of said one hydrostatic transmission, a second hydraulic control means operatively associated with another of said hydrostatic transmissions for controlling the operation of said other hydrostatic transmission, each of said control means functioning to control the operation of its respective hydrostatic transmission independently of the operation of the other hydrostatic transmission, and an actuator member operatively connected to said first and second hydraulic control means for selectively operating said first and second hydraulic control means to thereby regulate the operation of said hydrostatic transmissions, said first and second hydraulic control means each including a cylinder assembly operatively associated with one of said hydrostatic transmissions and a valve means operable between a first condition enabling fluid to flow from a source of fluid under pressure to said cylinder assembly and a second condition blocking said flow of fluid, said valve means being movable from said second condition to said first condition in response to movement of said actuator member, and means for moving said valve means relative to said actuator member from said first condition to said second condition when said cylinder assembly has been operated to an extent which is a function of a distance through which said actuator member was moved in operating said valve means from said second condition to said first condition.

5. Apparatus for controlling the operation of a plurality of hydrostatic transmissions, said apparatus comprising a first hydraulic control means operatively associated with one of said hydrostatic transmissions for controlling the operation of said one hydrostatic transmission, a second hydraulic control means operatively associated with another of said hydrostatic transmissions for controlling the operation of said other hydrostatic transmission, each of said control means functioning to control the operation of its respective hydrostatic transmission independently of the operation of the other hydrostatic transmission, and an actuator member operatively connected to said first and second hydraulic control means for selectively operating said first and second hydraulic control means to thereby regulate the operation of said hydrostatic transmissions, said hydrostatic transmissions are each operable in forward and reverse directions and said first and second hydraulic control means each include a cylinder assembly having a piston operatively associated with one of said hydrostatic transmissions and a valve means operatively connected to said actuator member for regulating the operation of said cylinder assembly, said valve means being operable from a first condition to a second condition by said actuator member to connect said cylinder assembly to a source of fluid under pressure in such a manner as to move said piston in one direction from an initial position to thereby operate the associated hydrostatic transmission in said forward direction, said valve being operable from said first condition to a third condition by said actuator member to connect said cylinder assembly to said source of fluid under pressure in such a manner as to move said piston in another direction from said initial position to thereby operate the associated hydrostatic transmission in said reverse direction.

6. Apparatus for controlling the transmission of power from a source of power to separate drive tracks of a vehicle by a plurality of hydrostatic transmissions each of which is operatively connected to one of said drive tracks, said apparatus comprising separate hydraulic power means each of which is associated with one of said hydrostatic transmissions to effect operation thereof, a hydraulic control means for controlling the actuation of said hydraulic power means, and manually operable control means operatively associated with said hydraulic control means and operable to effect simultaneous control of said hydraulic power means, said hydraulic control means including first and second valve assemblies which are operatively connected to said manual control means for operation to varying extents by said manual control means, said first valve assembly being operatively connected to one of said hydraulic power means for operating one of said hydrostatic transmissions to vary the ratio of input speed to output speed of said one of said hydrostatic transmissions independently of said other hydrostatic transmission upon operation of said manual control means, said second valve assembly being operatively connected to said other hydraulic power means for operating said other hydrostatic transmission to vary the ratio of input speed to output speed of said other hydrostatic transmission independently of said one hydrostatic transmission upon operation of said manual control means, said hydraulic control means further including antistall means operatively connected to said first and second valve assemblies for contemporaneously decreasing by substantially proportional amounts the extent of operation of said first and second valve assemblies to thereby effect a decrease in the output speed of each of said hydrostatic transmissions while maintaining a substantially constant relationship between the ratio of input speed to output speed of said hydrostatic transmissions.

7. Apparatus for controlling the transmission of power from a source of power to separate drive tracks of a vehicle by a plurality of hydrostatic transmissions each of which is operatively connected to one of said drive tracks, said apparatus comprising separate hydraulic power means each of which is associated with one of said hydrostatic transmissions to effect operation thereof, a hydraulic control means for controlling the actuation of said hydraulic power means, and manually operable control means operatively associated with said hydraulic control means and operable to effect simultaneous control of said hydraulic power means, said hydraulic control means including first and second valve assemblies which are operatively connected to said manual control means for operation to varying extents by said manual control means, said first valve assembly being operatively connected to one of said hydraulic power means for operating one of said hydrostatic transmissions to vary the ratio of input speed to output speed of said one of said hydrostatic transmissions independently of said other hydrostatic transmission upon operation of said manual control means, said second valve assembly being operatively connected to said other hydraulic power means for operating said other hydrostatic transmission to vary the ratio of input speed to output speed of said other hydrostatic transmission independently of said one hydrostatic transmission upon operation of said manual control means, said first and second valve assemblies including means for operating said valve assemblies to an initial position when the associated hydraulic power means has been operated to an extent which is a function of the extent of operation of the associated valve assembly.

8. Apparatus for controlling the transmission of power from a source of power to separate drive tracks of a vehicle by a plurality of hydrostatic transmissions each of which is operatively connected to one of said drive tracks, said apparatus comprising separate hydraulic power means each of which is associated with one of said hydrostatic transmissions to effect operation thereof, a hydraulic control means for controlling the actuation of said hydraulic power means, and manually operable control means operatively associated with said hydraulic control means and operable to effect simultaneous control of said hydraulic power means, said hydraulic control means including first and second valve assemblies which are operatively connected to said manual control means for operation to varying extents by said manual control means, said first valve assembly being operatively connected to one of said hydraulic power means for operating one of said hydrostatic transmissions to vary the ratio of input speed to output speed of said one of said hydrostatic transmissions independently of said other hydrostatic transmission upon operation of said manual control means, said second valve assembly being operatively connected to said other hydraulic power means for operating said other hydrostatic transmission to vary the ratio of input speed to output speed of said other hydrostatic transmission independently of said one hydrostatic transmission upon operation of said manual control means, said first and second valve assemblies each including a valve member movable between an initial condition blocking a flow of fluid from a source of fluid under pressure and an operated condition enabling fluid to flow from said source of fluid under pressure to the associated hydraulic power means to thereby operate the associated hydraulic power means, an actuator member operatively connected to said manual control means for operating said valve member from said initial condition to said operated condition, said actuator member being movable to varying extents relative to said valve member by said manual control means, and means for operating the associated valve assembly from said operated condition to said initial condition when the associated hydraulic power means has been operated to an extent which is a function of the extent of movement of said actuator member relative to said valve member to thereby enable the ratio of input speed to output speed of the associated hydrostatic transmission to be varied by an amount which is a function of the extent of operation of the associated one of said valve assemblies.

9. An assembly comprising first and second hydrostatic transmissions operable independently of each other to transmit power at different rates from a source of power, control means operatively associated with said first and second hydrostatic transmissions for independently adjusting the hydrostatic transmissions to transmit power at said different rates, sensor means for detecting at least one condition indicative of an impending stalling of said source of power, antistall means operatively associated with said sensor means and said control means for operating said control means to reduce the output speed of said first and second hydrostatic transmissions by substantially equal percentages to thereby maintain substantially constant the relationship between the output speeds of said first and second hydrostatic transmissions, and an actuator member operatively connected to said control means through said antistall means for selectively operating said control means to vary the ratio of input speed to output speed of said first and second hydrostatic transmissions, said antistall means being operated in response to a detecting by said sensor means of an impending stalling of said source of power to vary a relationship between said actuator member and said control means to thereby reduce the output speeds of said first and second hydrostatic transmissions.

10. An assembly comprising first and second hydrostatic transmissions operable independently of each other to transmit power at different rates from a source of power, control means operatively associated with said first and second hydrostatic transmissions for independently adjusting the hydrostatic transmissions to transmit power at said different rates, sensor means for detecting at least one condition indicative of an impending stalling of said source of power, and antistall means operatively associated with said sensor means and said control means for operating said control means to reduce the output speed of said first and second hydrostatic transmissions by substantially equal percentages to thereby maintain substantially constant the relationship between the output speeds of said first and second hydrostatic transmissions, said control means including first and second hydraulic control assemblies which are associated with said first and second hydrostatic transmissions respectively, said antistall means including first and second antistall means operatively associated with said first and second control means respectively, and wherein said assembly further includes actuator means operatively associated with said first and second control means through said first and second antistall means, said first and second antistall means being operated in response to a detecting of said sensor means of an impending stalling of said source of power to vary a relationship between said actuator means and said first and second control assemblies to thereby reduce the rate of power transmission by said first and second hydrostatic transmissions.

11. Apparatus as set forth in claim 2 further including first and second antistall means operatively associated with said first and second hydraulic means respectively and with a source of power operatively associated with said hydrostatic transmissions, said first and second antistall means being operative to operate the associated hydraulic control means towards a neutral condition from their respective first and second conditions in response to a reduction in a rate of operation of said source of power to thereby reduce the output speed of said hydrostatic transmissions and to thereby enable the rate of operation of the source of power to increase.

12. Apparatus as set forth in claim 2 wherein said first and second hydraulic control means each include a cylinder assembly operatively connected with an associated hydrostatic transmission, and a valve means connected in fluid communication with said cylinder assembly and a source of fluid under pressure for regulating a flow of fluid from said source of fluid under pressure to said cylinder assembly, said actuator member being operatively connected to said valve means for varying the condition of said valve means to thereby control said flow of fluid from said source of fluid under pressure to said cylinder assembly.

13. Apparatus as set forth in claim 5 wherein said actuator member is selectively movable between one position in which one of said hydrostatic transmissions is operating in said forward direction and another of said hydrostatic transmissions is operating in said reverse direction and a second position in which said one of said hydrostatic transmissions is operating in said reverse direction and said other of said hydrostatic transmissions is operating in said forward direction.

14. Apparatus as set forth in claim 5 further including first means for operating said valve means from said second condition to said first condition when said piston has moved in said one direction from said initial position for a distance which is a function of a distance through which said actuator member is moved when said valve means is operated from said first condition to said second condition and second means for operating said valve means from said third condition to said first condition when said piston has moved in said other direction from said initial position for a distance which is a function of a distance through which said actuator is moved when said valve means is operated from said first condition to said third condition.

15. Apparatus as set forth in claim 14 wherein said first and second hydraulic control means each further include antistall means operatively associated with an engine for driving said hydrostatic transmissions and with said valve means for operating said valve means to said third condition from said first condition to move said piston in said one direction toward said initial position when said engine tends to stall with said piston displaced in said other direction from said initial position and for operating said valve means to said second condition from said first condition to move said piston in said other direction toward said initial position when said engine tends to stall with said piston displaced in said one direction from said initial position.

16. Apparatus as set forth in claim 6 wherein said antistall means includes speed responsive means operatively associated with said source of power for operating said antistall means to decrease the output speeds of said hydrostatic transmissions when said source of power is tending to stall.

17. Apparatus as set forth in claim 6 wherein said antistall means includes pivotally mounted cylinder means connected to said manual control means and piston means slidably mounted in said cylinder means and operatively connected to said first and second valve assemblies for contemporaneously operating said first and second valve assemblies upon a reduction in pressure in said cylinder means.

18. Apparatus as set forth in claim 17 wherein said cylinder and piston means includes a first cylinder and piston operatively associated with said first valve assembly and a second cylinder and piston operatively associated with said second valve assembly, and wherein said antistall means further includes speed responsive means operatively associated with said source of power for contemporaneously varying the pressure in said first and second cylinders when the rate of operation of said source of power decreases to a speed below a predetermined speed.

19. Apparatus as set forth in claim 8 further including return spring means operatively connected to said first and second valve assemblies for moving said first and second valve assemblies toward their initial positions when said manual control means is released.

20. Apparatus as set forth in claim 8 wherein said means for operating the valve assembly from said operated condition to said initial condition includes fluid conduit means connecting the associated hydraulic power means in fluid communication with said valve member to thereby apply fluid pressure against said valve member to urge said valve member toward said initial position.

21. Apparatus comprising first and second hydrostatic transmissions for transmitting power in forward and reverse directions independently of each other, first and second control means operatively associated with said first and second hydrostatic transmissions respectively for adjusting the associated hydrostatic transmissions to thereby vary the ratio of input speed to output speed and direction of operation of the associated one of said hydrostatic transmissions, actuator means connected to said first and second control means to selectively effect operation thereof, said first and second control means being responsive to the condition of said actuator means to adjust the ratio of input speed to output speed of said first and second hydrostatic transmissions and the direction of operation of said first and second hydrostatic transmissions as a function of the condition of said actuator means, and first and second antistall means operatively connected to said first and second control means respectively and responsive to an indication of an impending stall condition of a source of power connected to said first and second hydrostatic transmissions to independently reduce the output speed of said first and second hydrostatic transmissions by substantially equal percentages to thereby tend to prevent a stalling of said source of power.

22. Apparatus as set forth in claim 21 wherein said actuator means includes a single actuator member connected to a universal joint for movement from an initial condition to a plurality of different operated conditions.

23. Apparatus as set forth in claim 21 wherein said actuator means includes a pair of actuator members which are operatively associated with said first and second hydrostatic transmissions respectively.

24. An assembly for controlling the transmission of power by a reversible hydrostatic transmission, said assembly comprising a control cylinder assembly having a piston operatively connected to said hydrostatic transmission, spring means for urging said piston toward an initial position in a cylinder of said control cylinder assembly, a valve assembly connected in fluid communication with opposite end portions of said cylinder for selectively directing a flow of fluid from a source of fluid under pressure to said end portions of said cylinder to thereby move said piston relative to said cylinder, said valve assembly including at least one valve member mounted in a chamber in a housing and operable from an initial condition blocking the flow of fluid from said source of fluid under pressure to an operated condition, said valve member in an operated condition enabling fluid to flow to one of said end portions of said cylinder to move said piston in one direction from said initial position against the urging of said spring means to thereby adjust said hydrostatic transmission to operate in one direction, an actuator member for moving said valve member between said initial and operated conditions to thereby operate said control cylinder assembly to vary the ratio of input speed to output speed of said hydrostatic transmission, said actuator member being operable to varying extents from a neutral condition, and means for moving said valve member from an operated condition to said initial condition upon movement of said piston through a distance from said initial position which is a function of the extent to which said actuator member is operated to thereby block the flow of fluid and stop the movement of said piston when said piston has moved through said distance whereby the ratio of input speed to output speed of said hydrostatic transmission is adjusted by said control cylinder assembly to an extent which is a function of the extent to which said actuator member is operated.

25. An assembly as set forth in claim 24 wherein said means for moving said valve member is operative to effect return of said piston to said initial position by moving said valve member to an operated condition upon operation of said actuator member from an operated condition to said neutral condition and enabling said valve member to return to said initial condition when said piston is in said initial position.

26. An assembly as set forth in claim 24 further including antistall means for moving said valve member toward said initial condition from an operated condition in response to a sensing of an imminent stalling of a source of power associated with said hydrostatic transmission.

27. An assembly for controlling the transmission of power by a plurality of reversible hydrostatic transmissions independently of each other, said assembly comprising a first control cylinder assembly operatively connected to one of said hydrostatic transmissions for adjusting the ratio of input speed to output speed of said one hydrostatic transmission and the direction of operation of said one hydrostatic transmission, a second control cylinder assembly operatively connected to another of said hydrostatic transmissions for adjusting the ratio of input speed to output speed of said other hydrostatic transmission and the direction of operation of said other hydrostatic transmission independently of the rate at which power being transmitted by and the direction of operation of said one hydrostatic transmission, first spring means for urging said first control cylinder assembly toward an initial position, second spring means for urging said second control cylinder assembly toward an initial position, a first valve assembly connected in fluid communication with said first control cylinder assembly for directing a flow of fluid from a source of fluid under pressure to said first control cylinder assembly to thereby operate said first control cylinder assembly, a second valve assembly connected in fluid communication with said second control cylinder assembly for directing a flow of fluid from a source of fluid under pressure to said second control cylinder assembly to thereby operate said second control cylinder assembly, said first and second valve assemblies each including a valve member mounted in a chamber formed in a housing and operable from an initial condition blocking the flow of fluid from said source of fluid under pressure to a plurality of operated conditions, said valve member in one of said operated conditions enabling fluid under pressure to flow to one portion of an associated one of said control cylinder assemblies to thereby operate said associated control cylinder assembly in one direction from said initial position against the urging of an associated one of said spring means to adjust the associated one of said hydrostatic transmissions to operate in a first direction, said valve member in another of said operated conditions enabling fluid to flow to another portion of said associated control cylinder assembly to thereby operate said associated control cylinder assembly in another direction from said initial position against the urging of said associated spring means to adjust said associated hydrostatic transmission to operate in a second direction which is opposite to said first direction, and an actuator means operatively connected to said first and second valve assemblies for moving said valve members independently of each other between said initial and operated conditions to thereby operate said first and second control cylinder assemblies independently of each other to adjust the rate at which power is transmitted by said hydrostatic transmissions.

28. An assembly as set forth in claim 27 further including first and second connector means for operatively connecting the valve members of said first and second valve assemblies respectively with said actuator means, and first and second means associated with said first and second valve assemblies respectively for moving the associated valve members from said operated conditions to said initial conditions upon movement of the associated control cylinder assemblies through distances from said initial positions which are functions of distance through which said connector means are moved relative to said first and second valve assemblies to thereby block the flow of fluid and stop the operation of said first and second control assemblies when said first and second control assemblies have moved through distances which are a function of said distances through which said connector means are moved relative to said valve assemblies whereby said hydrostatic transmissions are independently adjusted by said first and second control assemblies to vary the ratio of input speed to output speed of said hydrostatic transmissions to extents which are a function of said distances through which said connector means are moved relative to said valve assemblies.

29. An assembly as set forth in claim 27 further including first and second antistall means connected to said first and second valve assemblies respectively for moving the associated value members toward said initial conditions from operated conditions in response to a sensing of an imminent stalling of a source of power associated with said hydrostatic transmissions.

30. An assembly for controlling transmission of power by a plurality of reversible hydrostatic transmissions independently of each other, said assembly comprising a first control cylinder assembly operatively connected to one of said hydrostatic transmission for adjusting the ratio of input speed to output speed of said one hydrostatic transmission and the direction of operation of said one hydrostatic transmission, a second control cylinder assembly operatively connected to another of said hydrostatic transmissions for adjusting the ratio of input speed to output speed of said other hydrostatic transmission and the direction of operation of said other hydrostatic transmission independently of the rate at which power being transmitted by and the direction of operation of said one hydrostatic transmission, a first valve assembly connected in fluid communication with said first control cylinder assembly for directing a flow of fluid from a source of fluid under pressure to said first control cylinder assembly to thereby operate said first control cylinder assembly, a second valve assembly connected in fluid communication with said second control cylinder assembly for directing a flow of fluid from a source of fluid under pressure to said second control cylinder assembly to thereby operate said second control cylinder assembly, first actuator means for operating said first valve assembly, said first actuator means being movable in one direction from a neutral position to operate said first valve assembly to direct fluid to flow under pressure to one portion of said first control cylinder assembly to oeprate said first control cylinder assembly one direction from an initial position to adjust said first hydrostatic transmission to operate in a first direction, said first actuator means being movable in another direction from said neutral position to operate said first valve assembly to direct fluid to flow under pressure to another portion of said first control cylinder assembly to operate said first control cylinder assembly in another direction from said initial position to adjust said first hydrostatic transmission to operate in a second direction, and a second actuator means for operating said second valve assembly, said second actuator means being movable in one direction from a neutral position to operate said second valve assembly to direct fluid to flow under pressure to one portion of said second control cylinder assembly to operate said second control cylinder assembly in one direction from an initial position to adjust said second hydrostatic transmission to operate in a first direction, said second actuator means being movable in another direction from said neutral position to operate said second valve assembly to direct fluid to flow under pressure to another portion of said second control cylinder assembly to operate said second control cylinder assembly in another direction from said initial position to adjust said second hydrostatic transmission to operate in a second direction.

31. An assembly as set forth in claim 30 further including first double acting spring means for resiliently urging said first actuator means to its neutral position and second doubles acting spring means for resiliently urging said second actuator means to its neutral position.

32. An assembly comprising first and second hydrostatic transmissions operable independently of each other to transmit power from a source of power, control means operatively associated with said first and second hydrostatic transmissions for independently adjusting the rate of power transmission by said hydrostatic transmissions and for controlling the direction of operation of said hydrostatic transmissions, said control means including a single manually operable control member for controlling the speed and direction of operation of said first and second hydrostatic transmissions, and means operatively interconnecting said single manually operable control member and said first and second hydrostatic transmissions for effecting a change in the output speed of said first hydrostatic transmission relative to said second hydrostatic transmission in response to movement of said single manually operable control member in one direction from an initial position and for effecting a change in output speeds of said first and second hydrostatic transmissions by substantially equal percentages in the same direction in response to movement of said single manually operable control member in another direction from the initial position to thereby change the output speeds of said first and second hydrostatic transmissions while maintaining substantially constant the relationship between the output speeds, sensor means for detecting at least one condition indicative of an impending stalling of said source of power, and antistall means operatively associated with said sensor means and said control means for operating said control means to reduce the output speeds of said first and second hydrostatic transmissions by substantially equal percentages to thereby maintain substantially constant the relationship between the output speeds of said first and second hydrostatic transmissions.

33. Apparatus for controlling the operation of a plurality of hydrostatic transmissions, said apparatus comprising a first hydraulic control means operatively associated with one of said hydrostatic transmissions for controlling the operation of said one hydrostatic transmission, a second hydraulic control means operatively associated with another of said hydrostatic transmissions, for controlling the operation of said other hydrostatic transmission, and a control assembly operatively connected to said first and second hydraulic control means for selectively operating said first and second hydraulic control means to thereby regulate the operation of said hydrostatic transmissions, said first and second hydraulic control means each including a valve assembly having a valve member movable from an initial position to an operated position, an actuator member connected to said control assembly, resilient connector means for operatively connecting said valve member with said actuator member whereby said valve member is movable from said initial position to said operated position by said actuator member upon operation of said control assembly, and means for effecting movement of said valve member relative to said actuator member to the initial position against the influence of said resilient connector means upon operation of an associated one of said hydrostatic transmissions to a condition corresponding to the extent of operation of said control assembly.

34. Apparatus as set forth in claim 33 wherein said control assembly includes a single manually operable control member and means for connecting said control member with the actuator members of said first and second hydraulic control means.

35. Apparatus for controlling the transmission of power from a source of power to separate drive tracks of a vehicle by a plurality of hydrostatic transmissions each of which is operatively connected to one of said drive tracks, said apparatus comprising a plurality of servomotors each of which is associated with one of said hydrostatic transmissions, a plurality of hydraulic power means each of which is associated with one of said servomotors to effect operation of the associated servomotor, hydraulic control means for controlling the actuation of said hydraulic power means, and manually operable control means operatively associated with said hydraulic control means and operable to effect simultaneous control of said hydraulic power means, said hydraulic control means including first and second valve assemblies which are operatively connected to said manual control means for operation to varying extents by said manual control means, said first valve assembly being operatively connected to one of said hydraulic power means for operating one of said servomotors to vary the ratio of input speed to output speed of said one of said hydrostatic transmissions upon operation of said manual control means, said second valve assembly being operatively connected to said other hydraulic power means for operating another of said servomotors to vary the ratio of input speed to output speed of said other hydrostatic transmission upon operation of said manual control means.

36. Apparatus as set forth in claim 35 further including sensor means for detecting at least one condition indicative of an impending stalling of said source of power and antistall means operatively associated with said sensor means and said hydraulic control means for operating said hydraulic control means to thereby operate said servomotors to reduce the output speed of each of said hydrostatic transmissions by substantially equal percentages to thereby maintain substantially constant the relationship between the output speeds of said hydrostatic transmissions.

37. Apparatus for controlling the operation of a plurality of hydrostatic transmissions, said apparatus comprising a first servomotor operatively associated with one of said hydrostatic transmissions and a second servomotor operatively associated with another of said hydrostatic transmissions for varying the ratio of transmission of power by said hydrostatic transmissions, a first hydraulic control means operatively associated with said first servomotor for controlling the operation of said one hydrostatic transmission independently of the operation of said other hydrostatic transmission, a second hydraulic control means operatively associated with said second servomotor for controlling the operation of said other hydrostatic transmission independently of the operation of said one hydrostatic transmission, and an actuator member operatively connected to said first and second hydraulic control means for selectively operating said first and second hydraulic control means to thereby regulate the operation of said first and second servomotors at the rate of power transmission by said hydrostatic transmissions, said first and second hydraulic control means each including valve means operatively connected with said actuator member for effecting operation of an associated one of said servomotors in response to operation of said actuator member, said valve means including a valve body, a valve member movable in said valve body, an operator member operatively connected to said valve member for moving said valve member relative to said valve body from an initial position to an operated position in response to operation of said actuator member, and means for effecting movement of said valve member relative to said operator member and said valve body from said operated position to said initial position upon operation of the associated servomotor to an extent corresponding to the extent of operation of said actuator member.

38. An assembly comprising first and second hydrostatic transmissions operable independently of each other to transmit power from a source of power, control means operatively associated with said first and second hydrostatic transmissions for independently adjusting the rate of power transmission by said hydrostatic transmissions, said control means including a single manually operable control member for controlling the speed and direction of operation of said first and second hydrostatic transmissions, sensor means for detecting at least one condition indicative of an impending stalling of said source of power, and antistall means operatively associated with said sensor means and said control means for operating said control means to reduce the output speed of said first and second hydrostatic transmissions by substantially equal percentages to thereby maintain substantially constant the relationship between the output speeds of said first and second hydrostatic transmissions, said sensor means including speed responsive means operatively connected to said source of power and adapted to be driven at a speed which is a function of the speed of operation of said source of power, said speed responsive means being operable to detect when the speed of operation of said source of power is below a predetermined speed.

39. An apparatus as set forth in claim 37 further including antistall means which is operatively associated with a source of power for driving said first and second hydrostatic transmissions and said first and second hydraulic control means, said antistall means being operable to actuate said first and second hydraulic control means to thereby operate said first and second servomotors to reduce the output speed of said first and second hydrostatic transmissions and substantially equal percentages in response to an impending stalling of the source of power to thereby tend to prevent a stalling of the source of power.

References Cited

UNITED STATES PATENTS

| | | | |
|---|---|---|---|
| 2,941,609 | 6/1960 | Bowers et al. | 60—53 XR |
| 3,142,964 | 8/1964 | Thoma et al. | |
| 3,161,245 | 12/1964 | Thoma | 60—53 XR |
| 3,247,919 | 4/1966 | Moon | 180—6.48 |
| 3,323,607 | 6/1967 | Futamata | 180—77 |

EDGAR W. GEOGHEGAN, Primary Examiner

U.S. Cl. X.R.

60—53; 91—413; 180—66